(12) United States Patent
Takahashi et al.

(10) Patent No.: US 10,186,921 B2
(45) Date of Patent: Jan. 22, 2019

(54) STATOR OF ROTARY ELECTRIC MACHINE HAVING SLOTS COILS AND CONNECTION COILS

(71) Applicant: HONDA MOTOR CO., LTD., Tokyo (JP)

(72) Inventors: Tadanobu Takahashi, Wako (JP); Tomotaka Iki, Wako (JP); Kentaro Nagahiro, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 738 days.

(21) Appl. No.: 14/668,899

(22) Filed: Mar. 25, 2015

(65) Prior Publication Data

US 2015/0280503 A1 Oct. 1, 2015

(30) Foreign Application Priority Data

Mar. 31, 2014 (JP) .................................. 2014-072867

(51) Int. Cl.
*H02K 3/04* (2006.01)
*H02K 3/12* (2006.01)
(Continued)

(52) U.S. Cl.
CPC ................. *H02K 3/12* (2013.01); *H02K 3/28* (2013.01); *H02K 3/50* (2013.01); *H02K 3/04* (2013.01);
(Continued)

(58) Field of Classification Search
CPC .. H02K 3/04; H02K 3/12; H02K 3/18; H02K 3/24; H02K 3/28; H02K 3/32; H02K 3/34;
(Continued)

(56) References Cited

U.S. PATENT DOCUMENTS 3,944,857 A * 3/1976 Faulhaber ................ H02K 3/26
310/266
9,362,809 B2 * 6/2016 Kishi ....................... H02K 3/12
(Continued)

FOREIGN PATENT DOCUMENTS

JP 2011-234443 11/2011
JP 2013-027175 2/2013
(Continued)

OTHER PUBLICATIONS

Japanese Office Action for corresponding JP Application No. 2014-072867, dated Jan. 4, 2017 (w/ English machine translation).

*Primary Examiner* — Bernard Rojas
*Assistant Examiner* — Rashad Johnson
(74) *Attorney, Agent, or Firm* — Mori & Ward, LLP

(57) ABSTRACT

A stator of a rotary electric machine includes a stator core and a coil. The stator core includes slots extending in an axial direction of the stator core and a first axial end surface in the axial direction. The coil is attached to the stator core and includes slot coils disposed in the slots and connection coils. At least one of the slot coils includes a slit in a part positioned in a slot among the slots. The slit extends through the at least one of the slot coils from a first axial end side of the stator core toward a second axial end side of the stator core opposite to the first axial end side in the axial direction. The connection coils are connected to the slot coils at a contact portion at a position outward from the first axial end surface in the axial direction.

2 Claims, 18 Drawing Sheets

(51) Int. Cl.
*H02K 3/28* (2006.01)
*H02K 3/50* (2006.01)
H02K 15/00 (2006.01)
H02K 3/24 (2006.01)
H02K 3/18 (2006.01)
H02K 3/34 (2006.01)
H02K 9/22 (2006.01)
H02K 3/32 (2006.01)

(52) U.S. Cl.
CPC ............... *H02K 3/18* (2013.01); *H02K 3/24* (2013.01); *H02K 3/32* (2013.01); *H02K 3/34* (2013.01); *H02K 3/345* (2013.01); *H02K 9/22* (2013.01); *H02K 15/0025* (2013.01); *H02K 2213/03* (2013.01)

(58) Field of Classification Search
CPC ............ H02K 3/345; H02K 3/50; H02K 9/22; H02K 15/0025; H02K 15/0081; H02K 15/0414; H02K 2213/03

USPC ...... 310/154.01–154.49, 179, 180, 181, 196, 310/201–210, 214, 215, 216, 260, 270, 71
See application file for complete search history.

(56) References Cited

U.S. PATENT DOCUMENTS

| | | | |
|---|---|---|---|
| 2006/0145558 A1* | 7/2006 | Kashihara | H02K 3/12 310/180 |
| 2007/0152520 A1* | 7/2007 | Takahashi | H02K 3/12 310/65 |
| 2013/0020890 A1* | 1/2013 | Iki | H02K 3/12 310/71 |
| 2017/0025907 A1* | 1/2017 | Iki | H02K 3/12 |
| 2017/0025913 A1* | 1/2017 | Nagahiro | H02K 3/12 |

FOREIGN PATENT DOCUMENTS

| | | |
|---|---|---|
| JP | 5389109 B2 | 2/2013 |
| JP | 2013-187076 | 9/2013 |
| JP | 2013-192439 | 9/2013 |

* cited by examiner

FIG. 15A
FIG. 15B
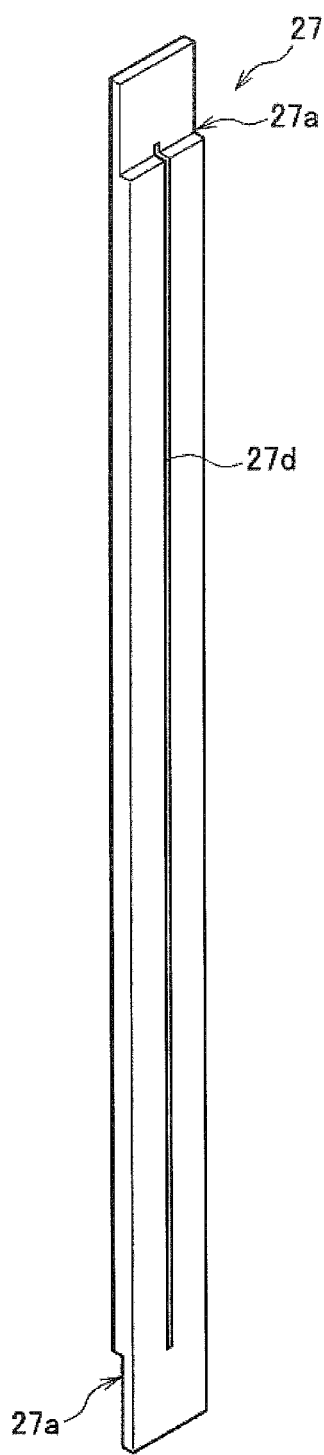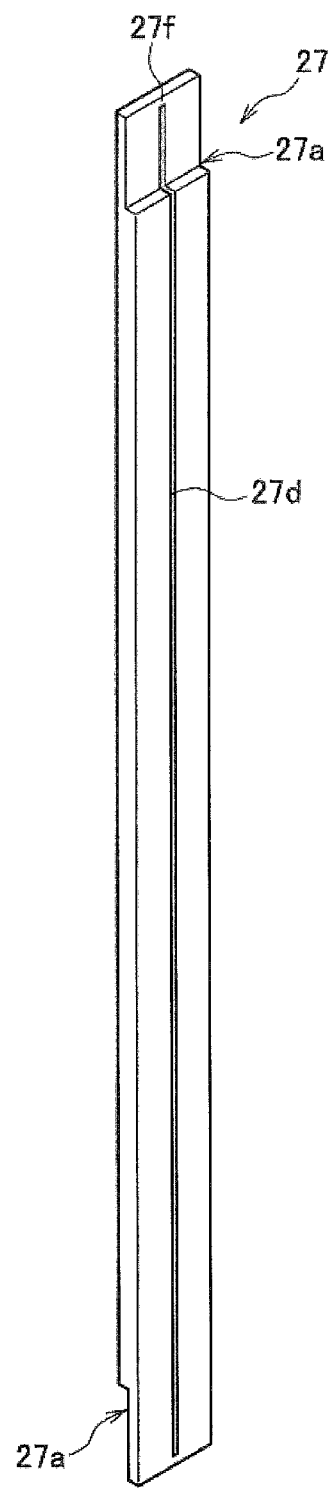

STATOR OF ROTARY ELECTRIC MACHINE HAVING SLOTS COILS AND CONNECTION COILS

CROSS-REFERENCE TO RELATED APPLICATIONS

The present application claims priority under 35 U.S.C. § 119 to Japanese Patent Application No. 2014-072867, filed Mar. 31, 2014, entitled "Stator of Rotary Electric Machine." The contents of this application are incorporated herein by reference in their entirety.

BACKGROUND

1. Field

The present disclosure relates to a stator of a rotary electric machine.

2. Description of the Related Art

A stator for a rotary electric machine including a coil that is obtained by winding a wire around teeth of a stator core is well known. Japanese Unexamined Patent Application Publication No. 2013-187076 describes that one coil includes a plurality of conductive wires. Such a configuration reduces the possibility that eddy current will be induced and increases the ratio of the area occupied by the wires in the slot.

A different type of stator for a rotary electric machine, which includes a segmented coil, has been recently developed. Japanese Patent No. 5389109 describes a coil loop including a slot coil, which is disposed in a slot of a stator core, and a connector coil, which is disposed outside the stator core to serve as a connecting portion. The slot coil and the connector coil are crimped together.

SUMMARY

According to one aspect of the present invention, a stator of a rotary electric machine includes a stator core and a coil. The stator core includes slots extending in an axial direction of the stator core and a first axial end surface in the axial direction. The coil is attached to the stator core and includes slot coils disposed in the slots and connection coils. At least one of the slot coils includes a slit in a part positioned in a slot among the slots. The slit extends through the at least one of the slot coils from a first axial end side of the stator core toward a second axial end side of the stator core opposite to the first axial end side in the axial direction. The connection coils are connected to the slot coils at a contact portion at a position outward from the first axial end surface in the axial direction.

According to another aspect of the present invention, a stator of a rotary electric machine includes a stator core and a coil. The stator core includes slots extending in an axial direction of the stator core and an axial end surface in the axial direction. The coil is attached to the stator core and includes slot coils disposed in the slots and connection coils. At least one of the slot coils includes at least two slot coil pieces. The connection coils are connected to the slot coils at a contact portion at a position outward from the axial end surface in the axial direction. Each of the connection coils includes a single member.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 15A is a perspective view of the radial inner slot coil illustrated in FIG. 5B.

FIG. 15B is a perspective view of a radial inner slot coil according to a first modification.

DESCRIPTION OF THE EMBODIMENTS

Figure 1:
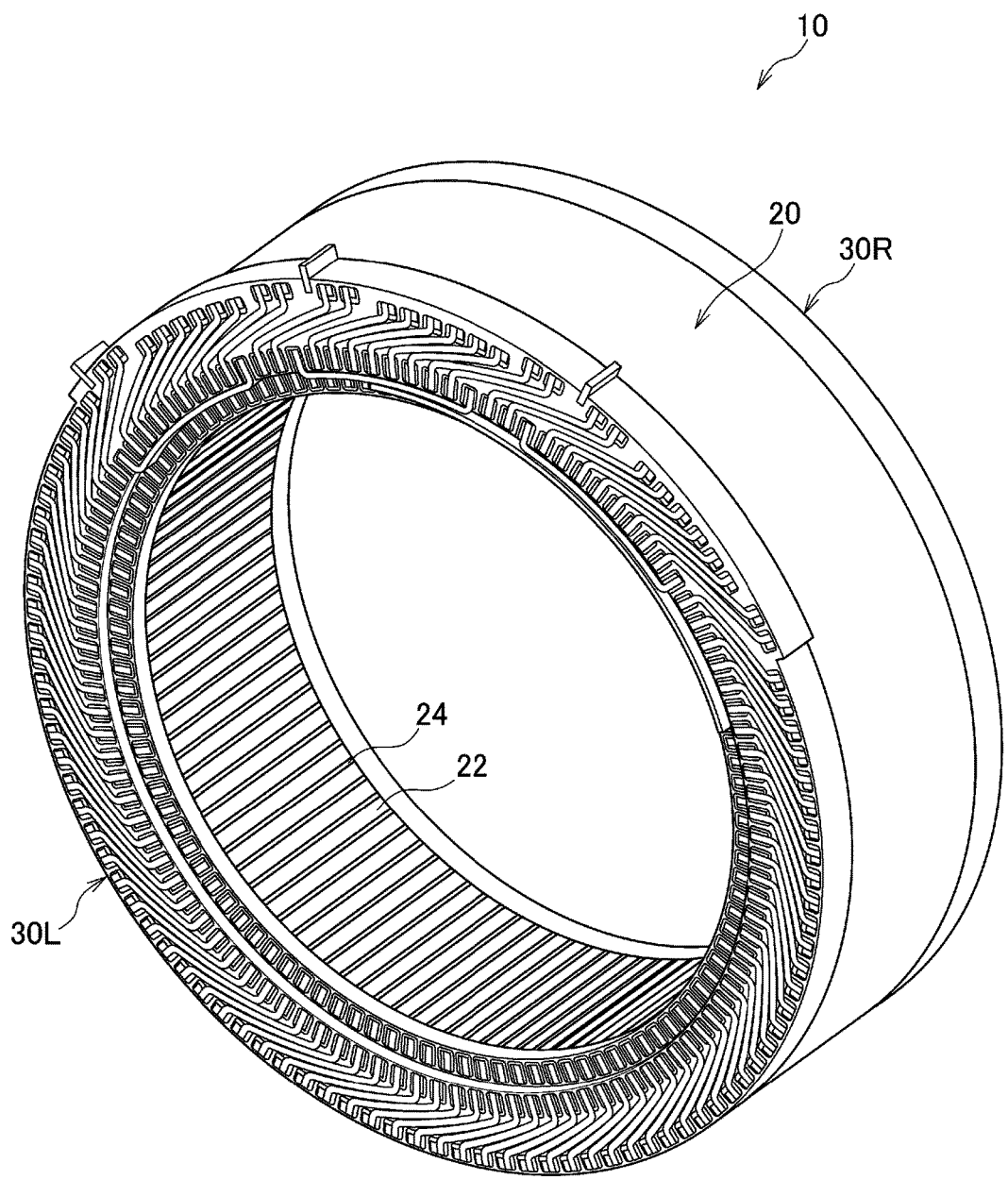
FIG. 1 is a perspective view of a stator for a rotary electric machine of this application.

The embodiments will now be described with reference to the accompanying drawings, wherein like reference numerals designate corresponding or identical elements throughout the various drawings.

An embodiment of a rotary electric machine of this application will be described with reference to the drawings. The drawings are oriented in the same direction as the reference numerals.

Stator

Figure 2:
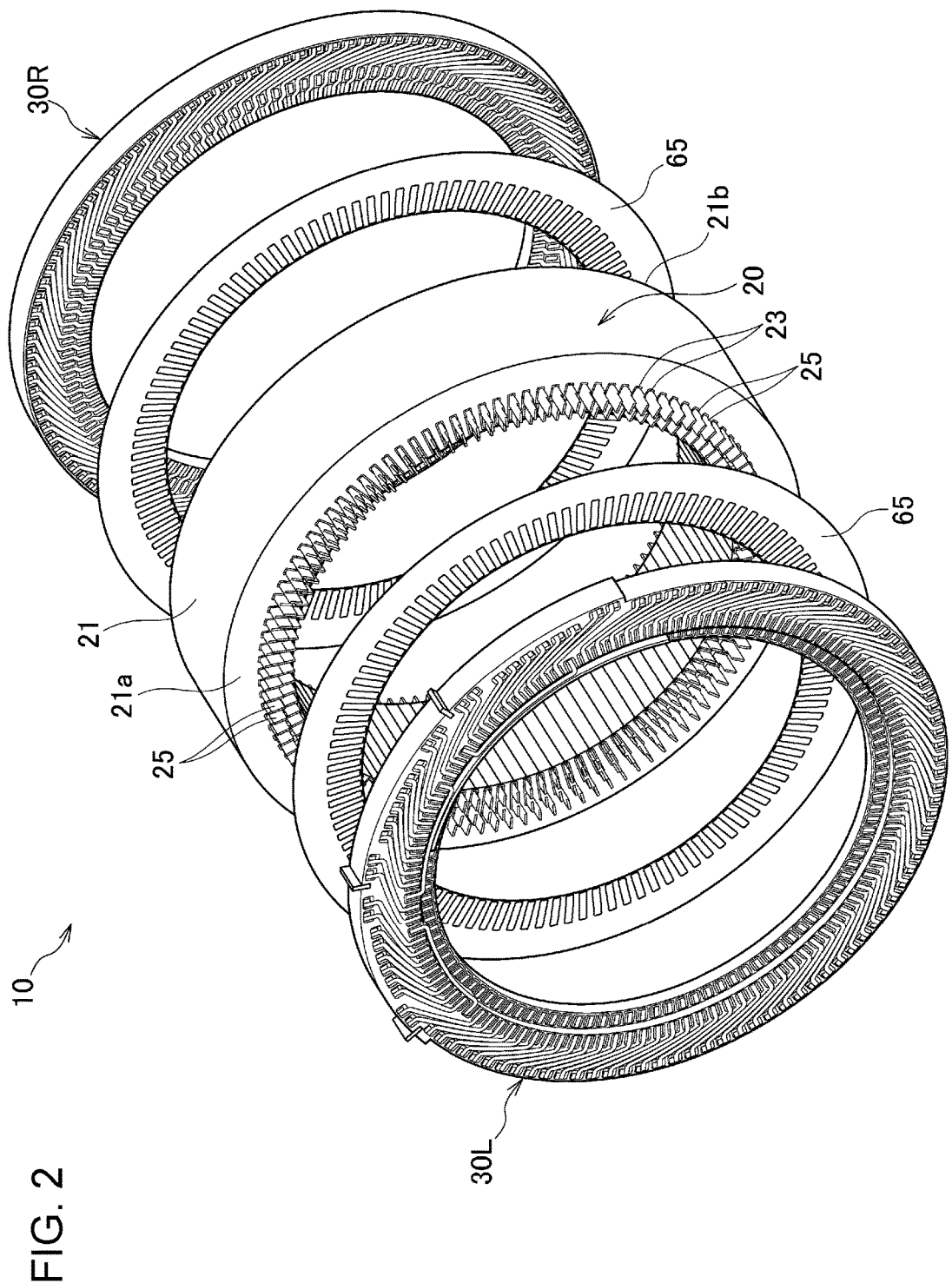
FIG. 2 is an exploded perspective view of the stator illustrated in FIG. 1.

As illustrated in FIG. 1 and FIG. 2, a stator for a rotary electric machine 10 of this embodiment includes a stator core assembly 20 and two baseplate assemblies 30L, 30R attached to both sides of the stator core assembly 20. An insulating sheet 65 such as a silicone sheet is disposed between the stator core assembly 20 and each of the baseplate assemblies 30L, 30R to isolate the stator core assembly 20 from the baseplate assemblies 30L, 30R.

1 Stator Core Assembly

The stator core assembly 20 includes a stator core 21 and a plurality (108 in this embodiment) of slot coils 25.

1-1 Stator Core

The stator core 21 includes a plurality of press-punched silicone steel sheets that are stacked in layers. The stator core 21 includes a plurality (108 in this embodiment) of teeth 22 on a radial inner surface thereof and a plurality (108 in this embodiment) of slots 23 positioned between adjacent teeth 22. The slots 23 each extend through the stator core 21 in an axial direction of the stator core 21. The slots 23 each have a substantially oval shape elongated in a radial direction of the stator core 21 when viewed in the axial direction. The slots 23 each have an opening 24 in an inner peripheral surface of the stator core 21.

1-2 Slot Coil

Figure 5A:
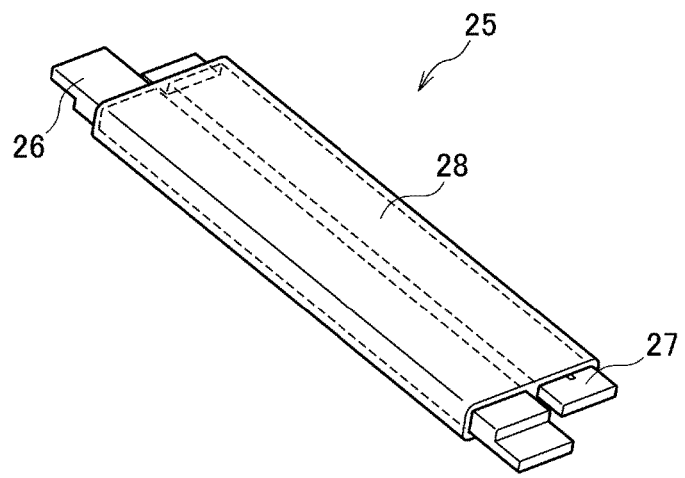
FIG. 5A is a perspective view of a slot coil.
Figure 5B:
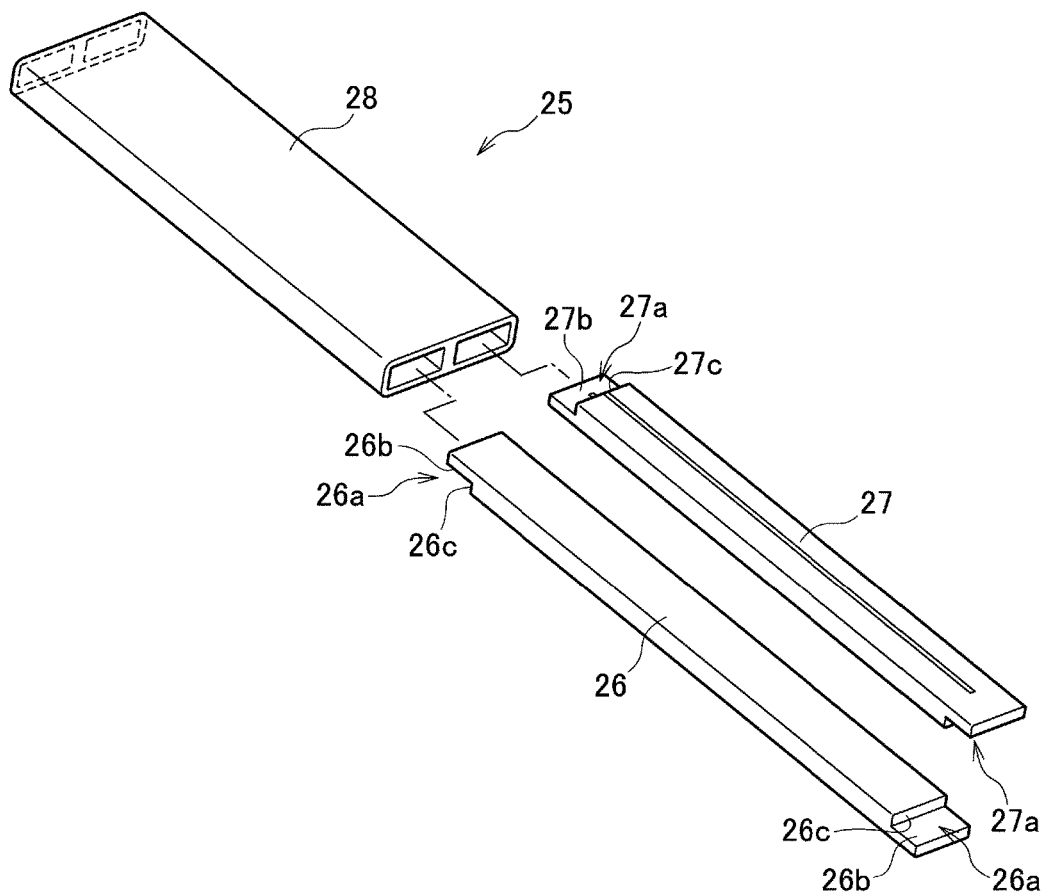
FIG. 5B is an exploded perspective view of a slot coil.
Figure 6:
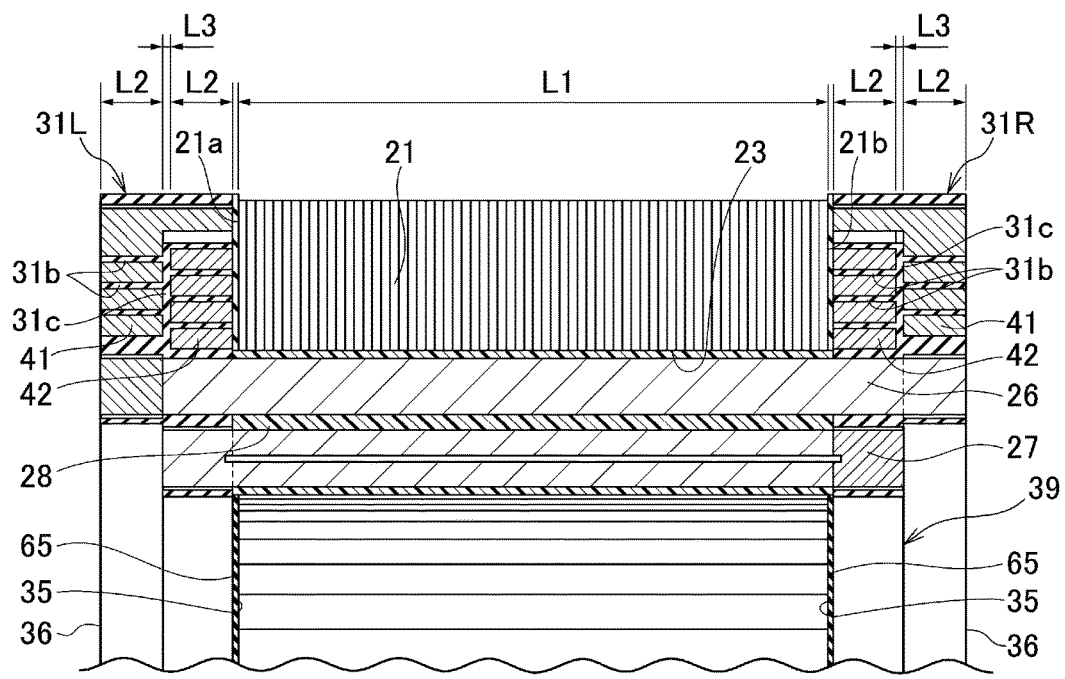
FIG. 6 is a vertical cross-sectional view of a part of the stator illustrated in FIG. 1.

The slot coil 25 disposed in each slot 23 will be described with reference to FIGS. 5A, 5B, and 6. Each slot coil 25 includes a radial outer slot coil 26 and a radial inner slot coil 27, which are flat conductors each having a rectangular cross-sectional shape. An insulating member 28 having a rectangular cross-sectional shape covers and unites the radial outer and inner slot coils 26, 27 except for both axial end portions thereof. The insulating member 28 is an injection molded member made of resin, for example.

Specifically, the radial outer slot coil 26 has a length (L1+4×L2) substantially equal to the sum of an axial width L1 of the stator core 21 and an axial width of four connection coils 40 (4×L2). The connection coils 40 will be described later. First and second axial end portions of the radial outer slot coil 26 each protrude from each end of the insulating member 28 by a length substantially equal to the sum of the axial width of two connection coils 40 (2×L2). The first axial end portion of the radial outer slot coil 26 includes a stepped portion 26a having a thinner thickness. The stepped portion 26a is a cutout facing in a first circumferential direction and extending in a length equal to the width of one connection coil 40 (L2). The second axial end portion of the radial outer slot coil 26 also includes a stepped portion 26a having a thinner thickness. The stepped portion 26a is a cutout facing in a second circumferential direction and extending in the length equal to the width of one connection coil 40 (L2).

The radial inner slot coil 27 has a length (L1+2×L2) substantially equal to the sum of the axial width of the stator core 21 (L1) and the axial width of two connection coils 40 (2×L2), which will be described later. First and second axial end portions of the radial inner slot coil 27 protrude from corresponding ends of the insulating member 28 by a length substantially equal to the axial width (L2) of one connection coil 40. The first axial end portion of the radial inner slot coil 27 has a stepped portion 27a having a thinner thickness. The stepped portion 27a is a cutout facing in the second circumferential direction and extending in the length (L2) equal to the axial width of one connection coil. The second axial end portion of the radial inner slot coil 27 also includes a stepped portion 27a having a thinner thickness. The stepped portion 27a is a cutout facing in the first circumferential direction and extending in the length (L2) equal to the axial width of one connection coil 40.

In short, the slot coil 25 is configured such that both axial end portions of the radial outer slot coil 26 protrude from the insulating member 28 by a length substantially equal to the sum of the axial width of two connection coils 40 (2×L2), both axial end portions of the radial inner slot coil 27 protrude from the insulating member 28 by a length substantially equal to the axial width of one connection coil 40 (L2), and both end portions of the radial outer and inner slot coils 26, 27 have the stepped portions 26a, 27a extending in the length equal to the axial length of one connection coil 40 and facing opposite circumferential directions. At the axial first and second end portions, the stepped portions 26a of the radial outer slot coil 26 face in the opposite circumferential directions and the stepped portions 27a of the radial inner slot coil 27 face in the opposite circumferential directions.

The radial inner slot coils 27 each have a slit 27d extending through the radial inner slot coil 27 between a surface facing the first circumferential direction and a surface facing the second circumferential direction. The slit 27d extends in a straight line along the center in the radial width from an axial end toward the other axial end of the radial inner slot coil 27 so as to reach the stepped portions 27a. The slit 27d is longer than the axial width (L1) of the stator core 21 in the axial direction and a portion thereof is positioned in the stepped portion 27a.

The plurality (108 in this embodiment) of slot coils 25, each of which includes the radial outer slot coil 26 and the radial inner slot coil 27, are disposed in the stator core 21 such that the radial outer slot coil 26 is positioned on the radial outer side and the radial inner slot coil 27 is positioned on the radial inner side. The slot coils 25 are inserted in corresponding slots 23 in the stator core 21 and arranged in the circumferential direction of the stator core 21 to constitute the stator core assembly 20.

The radial outer slot coil 26 is inserted into the slot 23 such that end portions thereof protrude from end surfaces 21a, 21b of the stator core 21 by a length substantially equal to the axial length of two connection coils 40 (2×L2). The radial inner slot coil 27 is inserted into the slot 23 such that end portions thereof protrude from the end surfaces 21a, 21b of the stator core 21 by a length substantially equal to the axial width of one connection coil 40 (L2). The slit 27d in the radial inner slot coil 27 extends beyond the end surfaces 21a, 21b of the stator core 21 and a small part thereof is positioned outside the end surfaces 21a, 21b.

The insulating member 28 that covers the radial outer and inner slot coils 26, 27 is positioned between the radial outer and inner slot coils 26, 27 and the slot 23 in the stator core 21. Thus, the stator core 21 is properly isolated.

The insulating member 28, which covers the radial outer and inner slot coils 26, 27, is slightly larger than that of the slot 23 and has a shape substantially the same as that of the slot 23. Thus, the insulating member 28 is readily fixed in the slot 23 by press-fitting. The radial outer and inner slot coils 26, 27 are thicker than conventional coils including a wound wire, and thus the ratio of the area occupied by the slot coils in the slot 23 is increased.

2 Baseplate Assemblies

Figure 3:
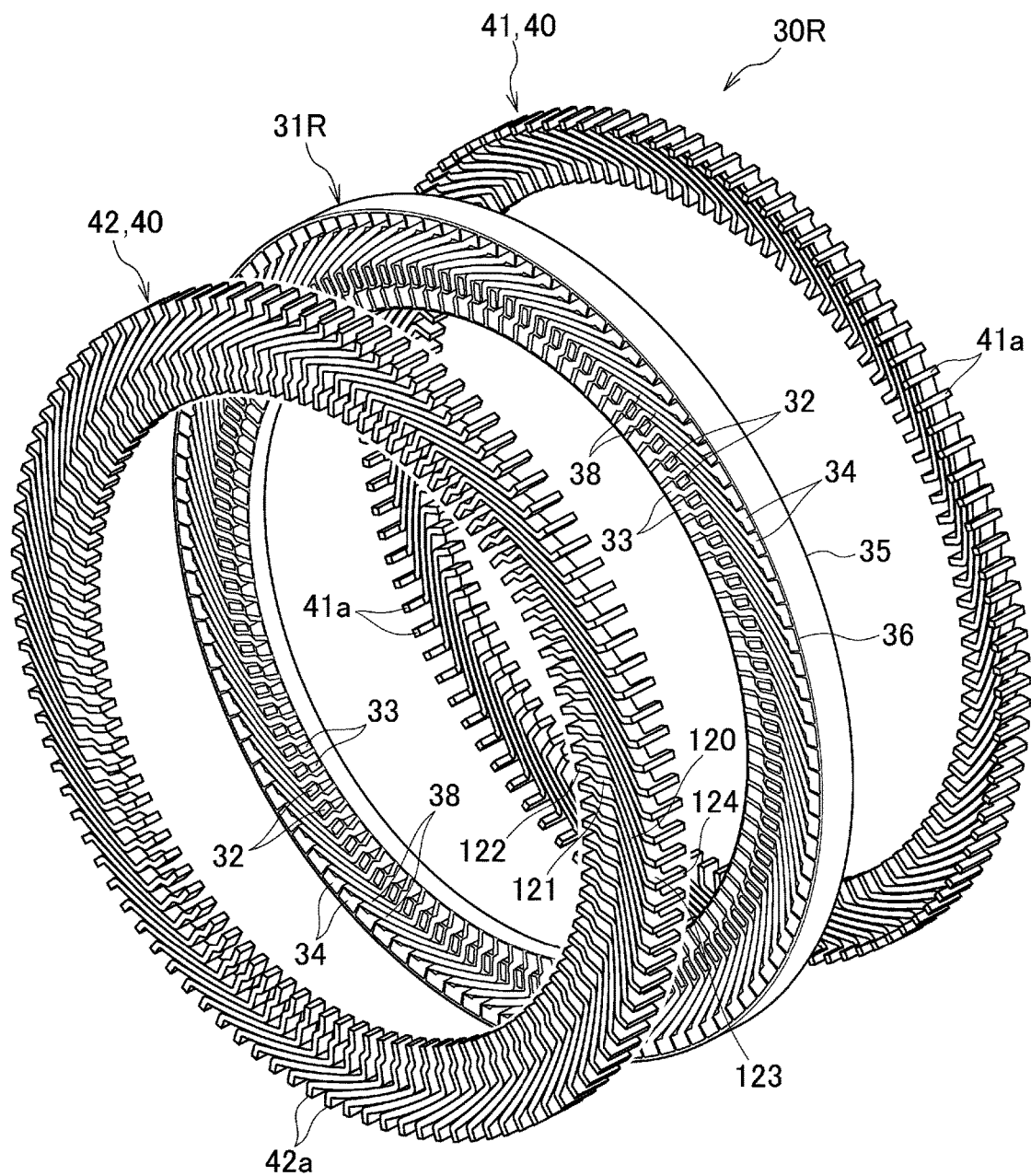
FIG. 3 is an exploded perspective view of one of baseplate assemblies illustrated in FIG. 2.
Figure 4:
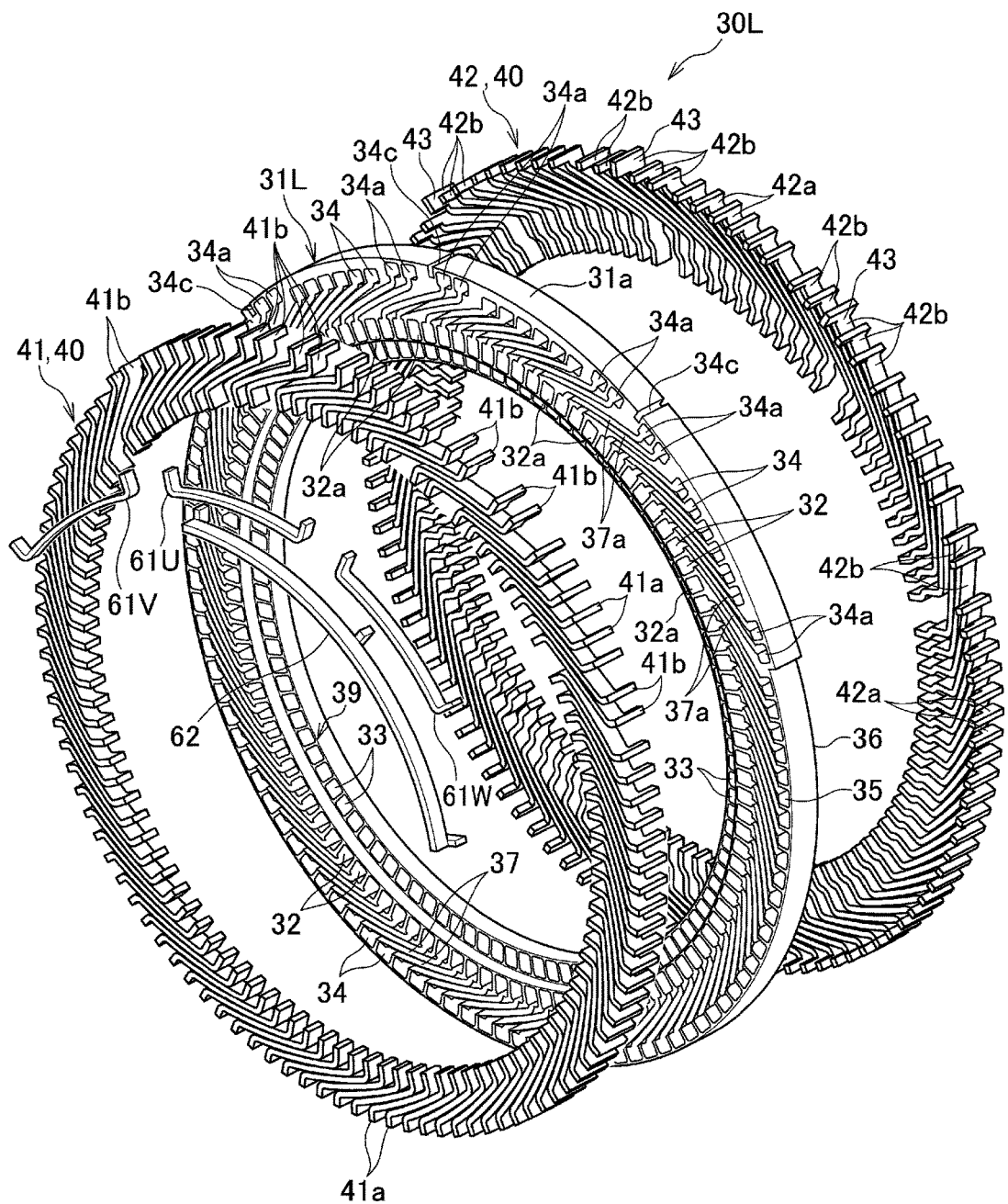
FIG. 4 is an exploded perspective view of the other one of the baseplate assemblies illustrated in FIG. 2.

As illustrated in FIG. 3 and FIG. 4, the baseplate assemblies 30L, 30R, which are disposed on the sides of the stator core assembly 20, each include baseplates 31L, 31R and the connection coils 40.

2-1 Baseplate

The baseplates 31L, 31R are made of an insulating resin (non-magnetic material), for example. The baseplates 31L, 31R each have a substantially circular shape having inner and outer diameters substantially equal to the inner and outer diameters of the stator core 21.

As illustrated in FIG. 3, the baseplate 31R has a plurality (108 in this embodiment) of radial outer through holes 32 and a plurality (108 in this embodiment) of radial inner through holes 33 with equal distances between adjacent radial outer through holes 32 and adjacent radial inner through holes 33. The radial outer and inner through holes 32, 33 correspond to the radial outer and inner slot coils 26, 27, respectively, of the slot coils 25 which are disposed in the slots 23 of the stator core 21. The radial outer and inner through holes 32, 33 extend through the baseplate 31R between an outer surface 35 and an inner surface 36 of the baseplate 31R. When the baseplate assembly 30R is attached to the stator core assembly 20, the end portion of the radial outer slot coil 26 disposed in the slot 23 of the stator core 21, which protrudes from the end surface 21b of the stator core 21, is positioned in the radial outer through hole 32 of the baseplate 31R, and the end portion of the radial inner slot coil 27 disposed in the slot 23 of the stator core 21, which protrudes from the end surface 21b of the stator core 21, is positioned in the radial inner through hole 32 of the baseplate 31R. The radial outer through holes 32 each have a smaller opening area in the outer surface 35 than in the inner surface 36 and extend through the baseplate 31R only at a part where the radial outer slot coil 26 passes through.

Figure 7A:
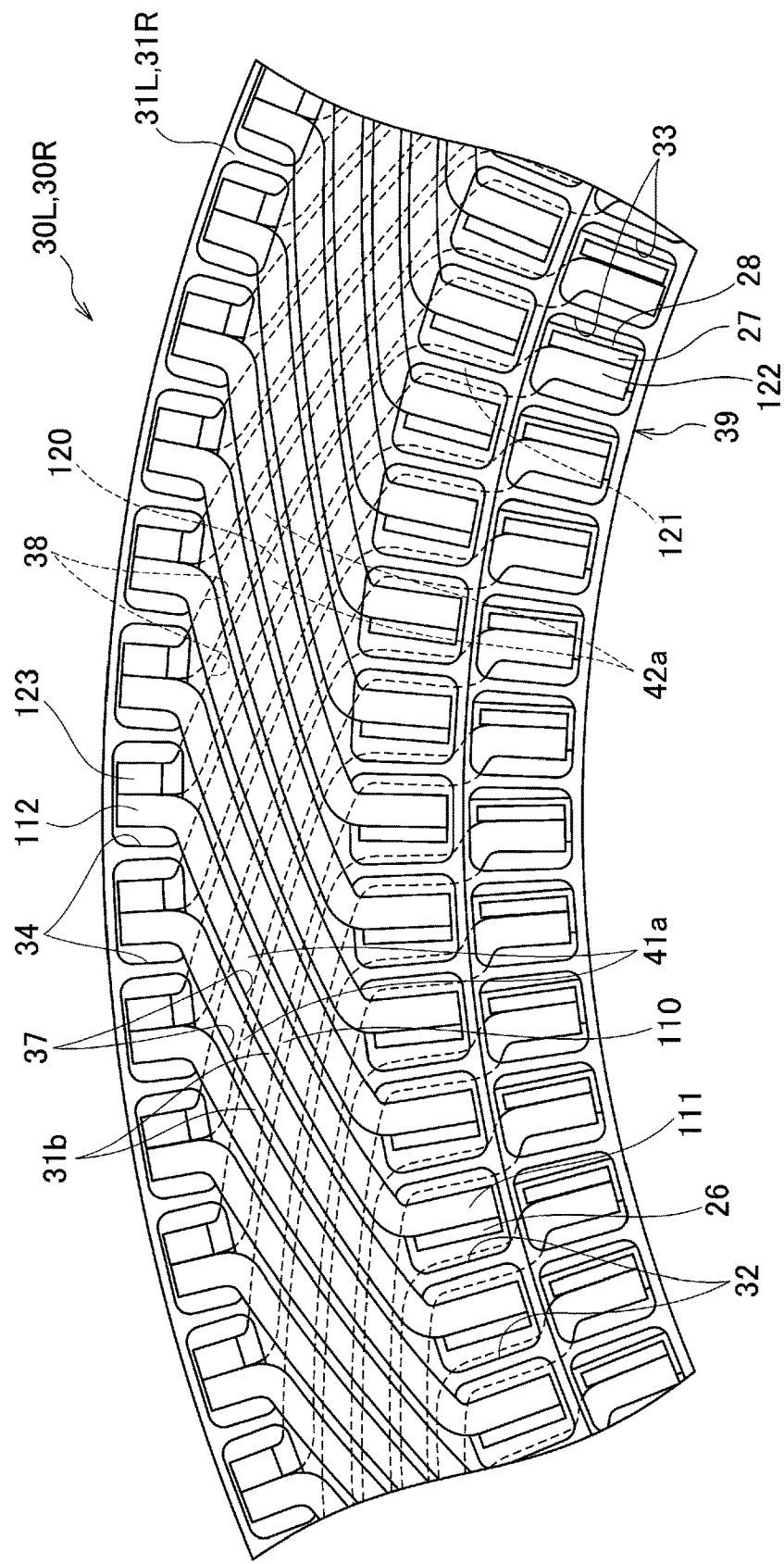
FIG. 7A is a front view of a part of the baseplate assembly illustrated in FIG. 3 or FIG. 4.

The baseplate 31R further has a plurality (108 in this embodiment) of outer circumferential holes 34 with equal distances therebetween. The outer circumferential holes 34 extend through the baseplate 31R between the outer surface 35 and the inner surface 36 of the baseplate 31R. As illustrated in FIG. 7A, the baseplate 31R includes a plurality (108 in this embodiment) of outer surface grooves 37 and a plurality (108 in this embodiment) of inner surface grooves 38. The outer and inner surface grooves 37, 38 have a substantially U-shaped cross section that opens in the outer surface 35 and in the inner surface 36, respectively, of the baseplate 31R. The outer and inner surface grooves 37, 38 are positioned close to each other in the circumferential direction and extend along the involute curve.

The baseplate 31L has substantially the same structure as the baseplate 31R. The baseplate 31L has a plurality (108 in this embodiment) of radial outer through holes 32 and a plurality (108 in this embodiment) of radial inner through holes 33 with equal distances between adjacent radial outer through holes 32 and adjacent radial inner through holes 33. The radial outer and inner through holes 32, 33 correspond to the radial outer and inner slot coils 26, 27, respectively, which are disposed in the slots 23 of the stator core 21. The radial outer and inner through holes 32, 33 extend through the baseplate 31L between the outer surface 35 and the inner surface 36 of the baseplate 31L.

The baseplate 31L includes an extended portion 31a having a fan-like shape extending radially outward at a radial outer side thereof. The extended portion 31a is positioned at an upper side in FIG. 4. In a section of the baseplate 31L without the extended portion 31a, the outer circumferential holes 34, which extend through the baseplate 31L between the outer surface 35 and the inner surface 36, are positioned with equal distances therebetween. In the extended portion 31a, two pairs of outer circumferential holes 34a each having a slightly larger opening area than the outer circumferential hole 34 are provided for each U-phase, V-phase, and W-phase such that six outer circumferential holes 34 are disposed therebetween. The extended portion 31a includes cutouts for an input terminal 34c for each phase with equal distances therebetween. In each cutout for an input terminal 34c, an input terminal 43 integrally included in each of three inner connection coils 42b, which will be described later, is positioned.

On the radial inner side of the extended portion 31a of the baseplate 31L, two pairs of radial outer through holes 32a are provided for each phase such that eight radial outer through holes 32 are positioned therebetween. Two pairs of the radial outer through holes 32a include a pair of cutouts for a busbar (not illustrated) in an inner circumferential surface thereof. In addition, radial inner through holes 33a are positioned such that eleven radial inner through holes 33 are positioned between two radial inner through holes 33a. The radial inner through hole 33a of each phase has a cutout for a neutral point busbar (not illustrated) in an inner circumferential surface thereof. In each cutout for a busbar, a connection portion of each busbar 61U, 61V, 61W that connects the coils of the same phase is positioned. In each cutout for a neutral point busbar, a connection portion of a neutral busbar 62 that connects the coils of the U-phase, V-phase, and W-phase is disposed.

In the outer circumferential holes 34, 34a of the baseplates 31L, 31R, radial outer end portions 112 of the outer connection coils 41 and radial outer end portions 123 of the inner connection coils 42, which will be described later, are positioned. Each of the radial outer through holes 32, 32a, the radial inner through holes 33, 33a, and the outer circumferential holes 34, 34a has a rectangular shape when viewed in the axial direction and has a larger space than the size of the coil member disposed therein.

The baseplate 31L also includes a plurality (102 in this embodiment) of outer surface grooves 37 and a plurality (102 in this embodiment) of inner surface grooves 38. The outer and inner surface grooves 37, 38 each have a substantially U-shaped cross section opening in the outer surface 35 and the inner surface 36, respectively, of the baseplate 31L. The outer and inner surface grooves 37, 38 extend along the involute curve and are arranged close to each other in the circumferential direction. In the outer surface 35 of the extended portion 31a, four of the outer surface grooves 37a for each phase, i.e., a total of twelve outer surface grooves 37a, extend slightly further than the other outer surface grooves 37. In the inner surface 36 of the extended portion 31a, five of the inner surface grooves 38a for each phase, i.e., a total of fifteen inner surface grooves 38a, extend slightly further than the other inner surface grooves 38. The number of outer surface grooves 37, 37a in the baseplate 31L is smaller than that of the outer surface grooves 37 in the baseplate 31R by two in each phase, i.e., a total of six. The number of inner surface grooves 38, 38a in the baseplate 31L is smaller than that of the inner surface grooves 38 in the baseplate 31R by one in each phase, i.e., a total of three. Instead, the busbars 61U, 61V, 61W connect the coils of the same phases and the neutral point busbar 62 connects the coils of different phases. As illustrated in FIG. 6, adjacent outer surface grooves 37, 37a and adjacent inner surface grooves 38, 38a in the baseplates 31L, 31R are isolated from each other by walls 31b extending from the baseplate 31L. The outer surface grooves 37, 37a and the inner surface grooves 38, 38a that face each other in the axial direction are isolated from each other by a partition wall 31c. Thus, they are electrically isolated.

The baseplates 31L, 31R each have a radial innermost portion 39 where the radial inner through holes 33 are positioned. The radial innermost portion 39 has a length (L2) equal to the axial width of one connection coil 40. The area other than that of the radially innermost portion 39 of each of the baseplates 31L, 31R, where the radial outer through holes 32 and the outer circumferential holes 34 are positioned, has an axial width (2×L2+L3) substantially equal to the sum of the axial width of two connection coils 40 (2×L2) and the thickness of the partition wall 31c (L3).

Figure 7B:
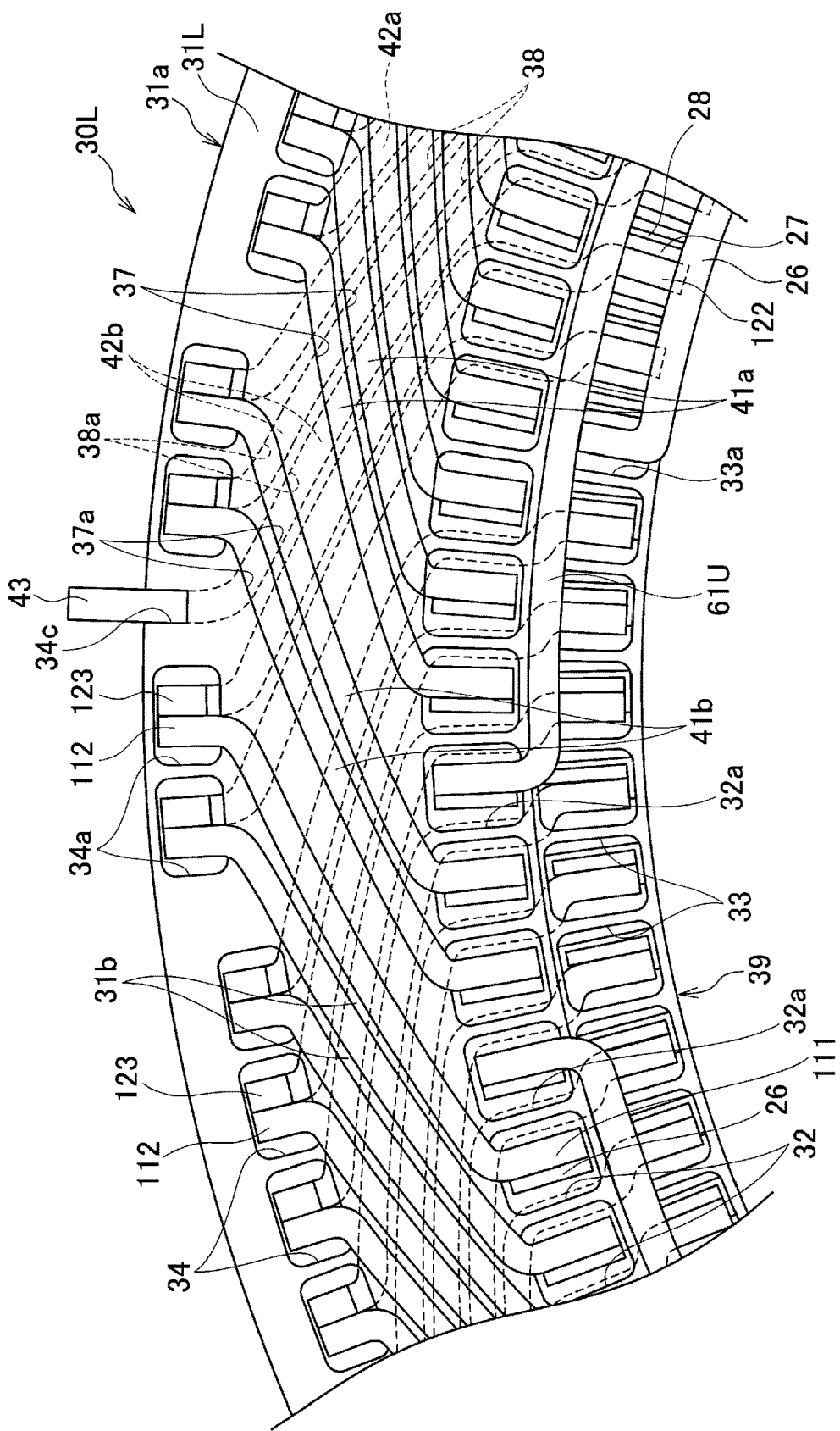
FIG. 7B is a front view of a part of the baseplate assembly illustrated in FIG. 4.

As illustrated in FIG. 7A, in the baseplate assemblies 30L, 30R, each of the outer surface grooves 37 of the baseplates 31L, 31R, when viewed from the front, extends, in the anticlockwise direction by a predetermined degree, along the involute curve between the outer circumferential hole 34 and the radial outer through hole 32 that is positioned away from the outer circumferential hole 34. As illustrated in FIG. 7B, twelve outer surface grooves 37a, which extend to the extended portion 31a, of the outer surface grooves 37 in the baseplate 31L, each extend, in the anticlockwise direction by a slightly larger degree than the predetermined degree, along the involute curve between the outer circumferential hole 34a and the radial outer through hole 32 that is positioned away from the outer circumferential hole 34a. In FIG. 7A and FIG. 7B, the outer connection coils 41 and the inner connection coils 42, which will be described later, are disposed in the outer surface grooves 37 and the inner surface grooves 38.

Each of the inner surface grooves 38 in the baseplate 31L, 31R, when viewed from the front, extends, in the anticlockwise direction (in the clockwise direction in FIG. 7A) by a predetermined degree while curving so as not to overlap the radial outer through hole 32, between the outer circumferential hole 34 and the radial inner through hole 33 that is positioned away from the outer circumferential hole 34. As illustrated in FIG. 7B, twelve inner surface grooves 38a, which extend to the extended portion 31a, of the inner surface grooves 38 in the baseplate 31L, extend, in the anticlockwise direction by a degree slightly more than the predetermined degree, along the involute curve between the outer circumferential hole 34a and the radial inner through hole 33 that is positioned away from the outer circumferential hole 34a. The remaining three of fifteen inner surface grooves 38a communicate with the cutouts for an input terminal 34c.

As illustrated in FIGS. 7A and 7B, the radial outer through hole 32 and the radial inner through hole 33 are coupled via the outer circumferential hole 34, to which both of the outer surface groove 37 and the inner surface groove 38 extend, or through the outer circumferential hole 34a, to which both of the outer surface groove 37a and the inner surface groove 38a extend.

2-2 Connection Coil

The connection coils 40 are each made of a conductive material such as copper and have a plate shape. The connection coils 40 include outer connection coils 41 (41a, 41b), which are disposed in the outer surface grooves 37, 37a, and inner connection coils 42 (42a, 42b), which are disposed in the inner surface grooves 38. The outer connection coils 41 herein are the connection coils 40 that are positioned on the axial outer side of the stator 10 and the inner connection coils 42 are the connection coils 40 that are positioned on the axial inner side of the stator 10, when the stator core assembly 20 and the baseplate assemblies 30L, 30R are fitted together.

The outer connection coil 41a is a flat conductor having a constant thickness and a rectangular cross-sectional shape. The outer connection coil 41a includes an outer connection coil body 110, a radial inner end portion 111, and a radial outer end portion 112. The outer connection coil body 110 extends along the involute curve in the same shape as the outer surface groove 37. The radial inner and outer end portions 111, 112 extend from the outer connection coil body 110 and curve in the radial direction. The outer connection coil 41a includes an outer connection coil extension 113 extending in the axial inward direction from the radial outer end portion 112. The outer connection coil body 110 and the radial inner end portion 111 each have the axial width (L2) equal to the depth of the outer surface groove 27. The outer connection coil extension 113 has an axial width (L4) equal to the sum (2×L2+L3) of the depth of the outer surface groove 37, the depth of the inner surface groove 38, and the thickness (L3) of the partition wall 31c. Twelve outer connection coils 41b have substantially the same configuration as the outer connection coils 41a with the exception that the outer connection coil bodies 110 curve in the same shape as the outer surface grooves 37a thereof.

The inner connection coil 42a is a flat conductor having a constant thickness and a rectangular cross-sectional shape. The inner connection coil 42a includes an inner connection coil body 120, a bypass portion 121, a radial inner end portion 122, and a radial outer end portion 123. The inner connection coil body 120 extends along the involute curve in the same shape as the inner surface groove 38. The bypass portion 121 extends from the inner connection coil body 120 so as not to overlap the radial outer through hole 32. The radial inner end portion 122 extends from the bypass portion 121 and curves in the radial direction. The radial outer end portion 123 extends from the inner connection coil body 120 and curves in the radial direction. The radial outer end portion 123 of the inner connection coil 42a includes an inner connection coil extension 124 extending in an axial outward direction. The inner connection coil body 120 and the radial inner end portion 122 each have an axial width (L2) equal to the depth of the inner surface groove 38. The outer connection coil extension 124 has an axial width (L4) equal to the sum (2×L2+L3) of the depth of the outer surface groove 37, the depth of the inner surface groove 38, and the thickness (L3) of the partition wall 31c. Fifteen inner connection coils 42b, which are disposed in the inner surface grooves 38a, have substantially the same configuration as the inner connection coils 42a with the exception that the inner connection coil bodies 120 curve in the same shape as the inner surface grooves 38a. Three of fifteen inner connection coils 42b that are disposed at positions corresponding to the cutouts for the input terminal 34c each integrally include an output terminal portion 43, which is configured to be connected to an external device. The output terminal portion 43 is fitted into the cutout for the input terminal 34c.

The outer connection coils 41 and the inner connection coils 42 have the same thickness. In addition, the thickness of the outer connection coils 41 and the inner connection coils 42 is equal to the thickness of the radial outer slot coils 26 and the radial inner slot coils 27, which have the same thickness. The thickness of the outer connection coil 41 and the inner connection coil 42 is smaller than the axial width (L2) of the outer connection coil 41 and the inner connection coil 42 (the outer connection coil body 110 and the inner connection coil body 120). The above-described "axial width of the x number of connection coil 40 (x is 1, 2, or 4)" means the axial width of the outer connection coil body 110 or the inner connection coil body 120. The term "substantially equal" denotes uncertainly due to the partition wall 31c. The thickness of the insulation sheet 65 is not applicable.

The outer connection coils 41, the inner connection coils 42, and the slot coils 25, each member of which has a predetermined axial width and a planar shape, are obtained by press-punching, for example, a metal plate (copper plate, for example) having a predetermined thickness. The press-punched conductive plate is bent such that the outer connection coil 41 has the outer connection coil body 110, which extends along the involute curve in the same shape as the outer surface grooves 37, 37a, and the radial inner and outer end portions 111, 112, which extend from the outer connection coil body 110 while curving. Similarly, the pressed-punched conductive plate is bent such that the inner connection coil 42 including the inner connection coil body 120 extends along the involute curve in the same shape as the inner surface grooves 38, 38a, and the radial inner and outer end portions 122, 123 extend from the inner connection coil body 120 while curving.

Figure 14:
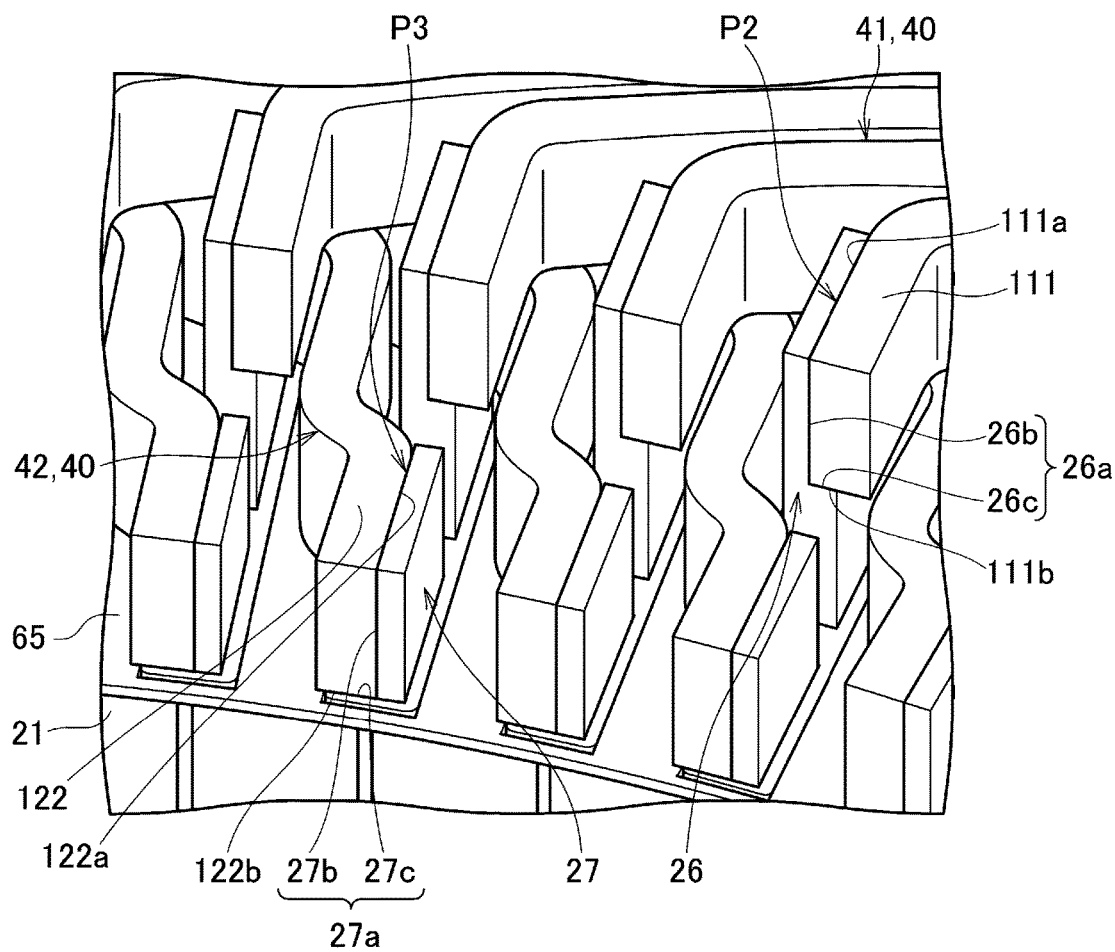
FIG. 14 is a perspective view illustrating how a radial inner end portion of the outer connection coil and a stepped portion of a radial outer slot coil are connected to each other and how a radial inner end portion of a radial inner connection coil and a stepped portion of a radial inner slot coil are connected to each other.

The outer connection coils 41a, 41b are disposed in the outer surface grooves 37, 37a of the baseplates 31L, 31R. The radial inner end portions 111 of the outer connection coils 41 are positioned in the radial outer through holes 32. As illustrated in FIG. 14, the radial inner end portion 111 is inserted into the slot 23 of the stator core 21 when the stator core assembly 20 and the baseplate assemblies 30L, 30R are fitted together. The radial inner end portion 111 is in contact with the stepped portion 26a of the radial outer slot coil 26, which is positioned in the outer through hole 32.

The inner connection coils 42a, 42b are disposed in the inner surface grooves 38, 38a of the baseplates 31L, 31R. The radial inner end portions 122 of the inner connection coils 42a, 42b are positioned in the radial inner through holes 33. As illustrated in FIG. 14, the radial inner end portion 122 is also inserted into the slot 23 of the stator core 21 when the stator core assembly 20 and the baseplate assemblies 30L, 30R are fitted together. The radial inner end portion 122 is in contact with the stepped portion 27a of the radial inner slot coil 27, which is positioned in the inner through hole 33.

Figure 13:
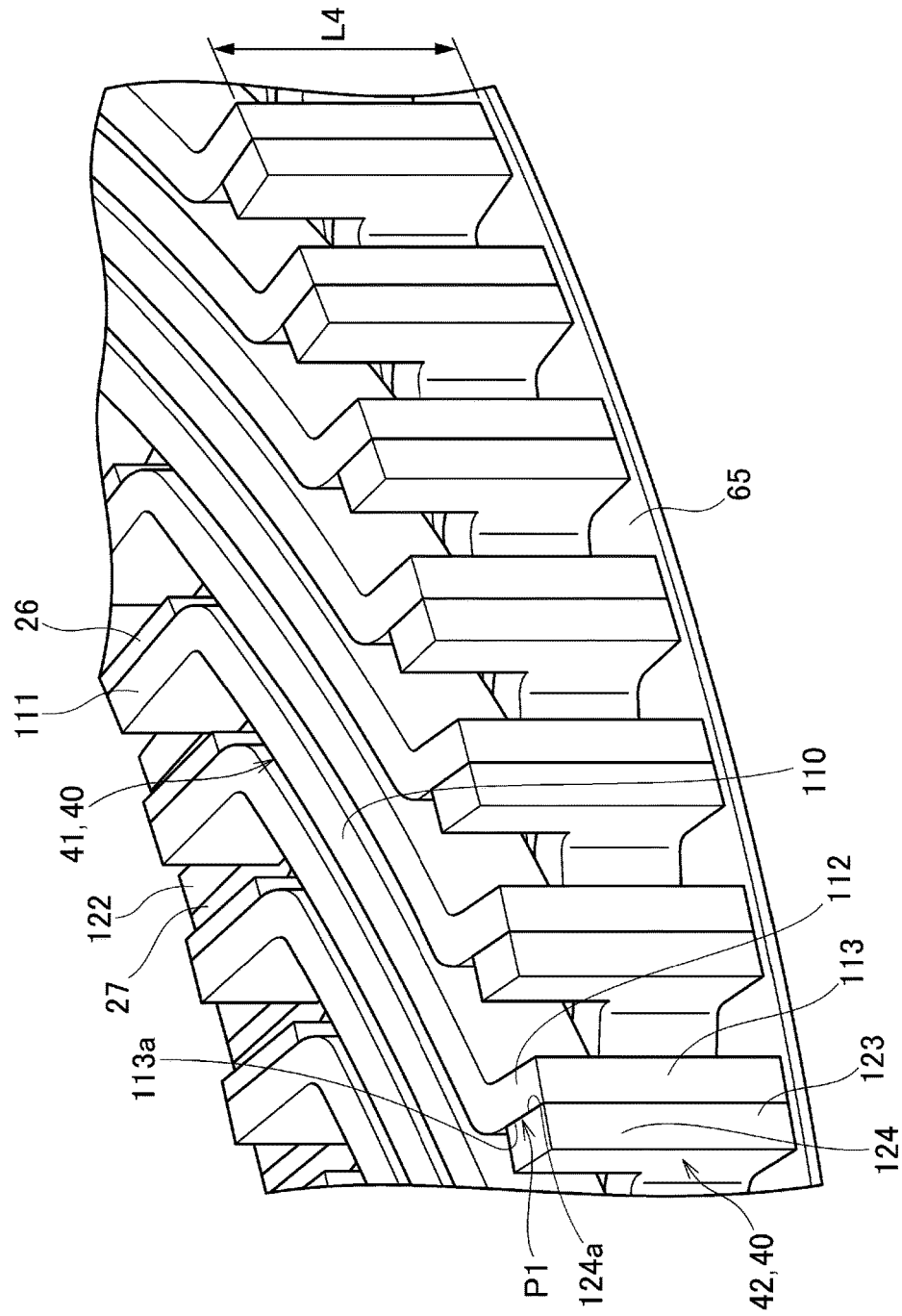
FIG. 13 is a perspective view illustrating how an outer connection coil extension and an inner connection coil extension are connected to each other.

As illustrated in FIG. 13, the radial outer end portion 112 of the outer connection coils 41a, 41b and the radial outer end portion 123 of the inner connection coils 42a, 42b are positioned in the outer circumferential hole 34. A side surface 113a of the outer connection coil extension 113, which faces in the first circumferential direction, and a side surface 124a of the inner connection coil extension 124, which faces in the second circumferential direction, are in contact with each other over their entire area extending in the radial direction and the axial direction.

3 Connection

The radial inner end portion 111 of the outer connection coil 41 and the stepped portion 26a of the radial outer slot coil 26, which are in contact with each other, the radial inner end portion 122 of the inner connection coil 42 and the stepped portion 27a of the radial inner slot coil 27, which are in contact with each other, and the outer connection coil extension 113 of the outer connection coil 41 and the inner connection coil extension 124 of the inner connection coil 42, which are in contact with each other, are connected to each other by welding, preferably by laser welding, at their planar surfaces extending in a direction intersecting the thickness direction thereof. In the following description, the laser welding is employed to form the connection, for example.

As illustrated in FIG. 13, the outer connection coil extension 113 and the inner connection coil extension 124 are in contact with each other over the entire planar surfaces thereof extending in the radial direction and the axial direction. The planar surfaces, which extend in the direction intersecting the thickness direction and in the axial direction, are the side surface 113a of the outer connection coil extension 113, which faces in the first circumferential direction, and the side surface 124a of the inner connection coil extension 124, which faces in the second circumferential direction. The side surfaces 113a, 124 in contact with each other are laser welded along a contact surface P1 extending in the radial direction from the axial outer side of the outer circumferential hole 34. As a result, the radial outer end portion 112 of the outer connection coil 41 and the radial outer end portion 123 of the inner connection coil 42, which are positioned in the same outer circumferential hole 34, are electrically connected to constitute the baseplate assemblies 30L, 30R. The baseplates 31L, 31R are not illustrated in FIG. 13 and FIG. 14.

The stator core assembly 20 and the baseplate assemblies 30L, 30R are fitted together in the axial direction after the relative positions thereof in the circumferential direction are determined with the insulating sheet 65 disposed therebetween. As illustrated in FIG. 14, the positions thereof are determined when the radial inner end portion 111 of the outer connection coil 41 and the stepped portion 26a of the radial outer slot coil 26 come in contact with each other and the radial inner end portion 122 of the inner connection coil 42 and the stepped portion 27a of the radial inner end slot coil 27 come in contact with each other.

The radial inner end portion 111 of the outer connection coil 41, which is in contact with the stepped portion 26a of the radial outer slot coil 26, includes a side surface 111a, which is a planar surface facing the second circumferential direction, and a bottom surface 111b. The side surface 111a comes in contact with a side surface 26b of the stepped portion 26a over its entire area. The bottom surface 111b comes in contact with a bottom surface 26c of the stepped portion 26a over its entire area. The side surfaces 111a, 26b, each of which has a planar shape and extends in the direction intersecting the thickness direction and in the axial direction, are in contact with each other. In such a state, the side surfaces 111a, 26b are laser welded along a contact surface P2 extending in the radial direction from the axial outer side of the radial outer through hole 32.

The radial inner end portion 122 of the inner connection coil 42, which is in contact with the stepped portion 27a of the radial inner slot coil 27, includes a side surface 122a, which is a planar surface facing the first circumferential direction, and a bottom surface 122b. The side surface 122a is in contact with the side surface 27b of the stepped portion 27a over its entire area. The bottom surface 122b is in contact with the bottom surface 27c of the stepped portion 27a over its entire area. The side surfaces 122a, 27b, each of which is a planar surface extending in the direction intersecting the thickness direction and in the axial direction, are in contact with each other. In such a state, the side surfaces 122a, 27b are laser welded along a contact surface P3 extending in the radial direction from the axial outer side of the radial inner through hole 33.

In the same way, the stepped portion 26a of the radial outer slot coil 26, which is positioned in the radial outer through hole 32a including the cutout for a busbar, and a busbar connecting portion of the busbar 61U, 61V, or 61W are laser welded. The stepped portion 27a of the radial inner slot coil 27, which is positioned in the radial inner through hole 33a including the cutout for a neutral point busbar, and a neutral point busbar connecting portion of the neutral point busbar 62 are laser welded. As a result, each of the busbars 61U, 61V, 61W, and the neutral point busbar 62 are connected to the radial outer slot coil 26 and the radial inner slot coil 27.

The radial outer through holes 32, 32a, the radial inner through holes 33, 33a, and the outer circumferential holes 34 each have a rectangular shape when viewed in the axial direction and have a space larger than the size of the coil positioned therein. There is a gap between a site to be irradiated with the laser light and the baseplate 31L, 31R, and thus the baseplate 31L, 31R is unlikely to be damaged by the laser light.

Due to the above-described connection, the baseplate assemblies 30L, 30R are fitted to the stator core assembly 20 with the radial outer slot coils 26 and the radial inner slot coils 27, which are disposed in the slots 23 of the stator core 21, being electrically connected to each other through the outer connection coil 41 and the inner connection coil 42. The outer connection coil 41 and the inner connection coil 42 connect the slot coils 25 of the same phase (U-phase, for example) to provide a connecting portion of the coil 50.

Figure 10:
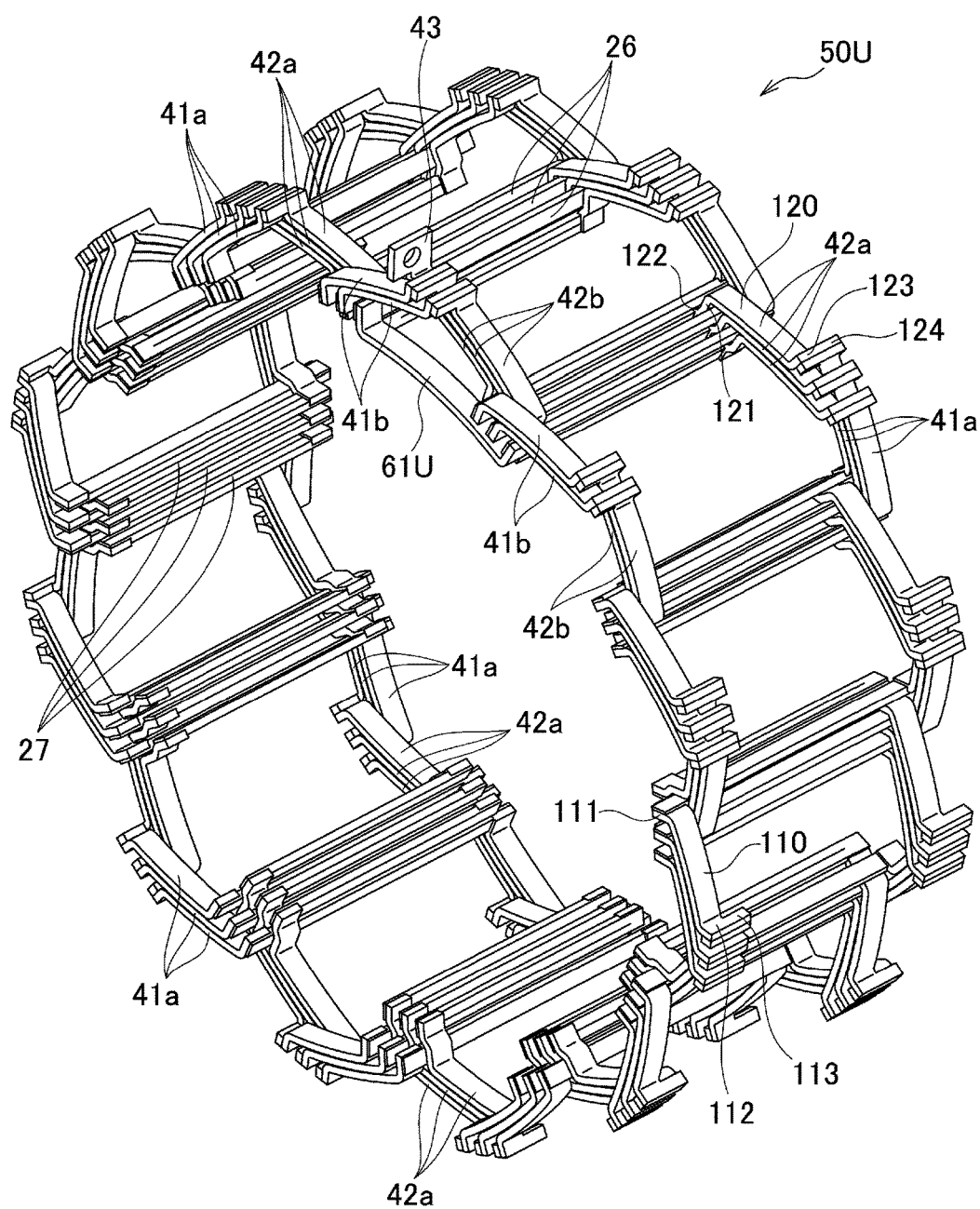
FIG. 10 is a perspective view of one of the coil phases in FIG. 8.

FIG. 10 illustrates the radial outer slot coil 26 and the radial inner slot coil 27 positioned in the same slot 23. The outer connection coil 41 connected to the first end (front end in FIG. 10) of the radial outer slot coil 26 extends outward in the radial direction and in the clockwise direction to be connected to the inner connection coil 42 of the same phase. The outer connection coil 41 connected to the second end (rear end in FIG. 10) of the radial outer slot coil 26 extends outward in the radial direction and in the anticlockwise direction to be connected to the inner connection coil 42 of the same phase. The inner connection coil 42 connected to the first end (front end in FIG. 10) of the radial inner slot coil 27 extends outward in the radial direction and in the anti-clockwise direction to be connected to the outer connection coil 41 of the same phase. The inner connection coil 42 connected to the second end (rear end in FIG. 10) of the radial inner slot coil 27 extends outward in the radial direction and in the clockwise direction to be connected to the outer connection coil 41 of the same phase.

Figure 8:
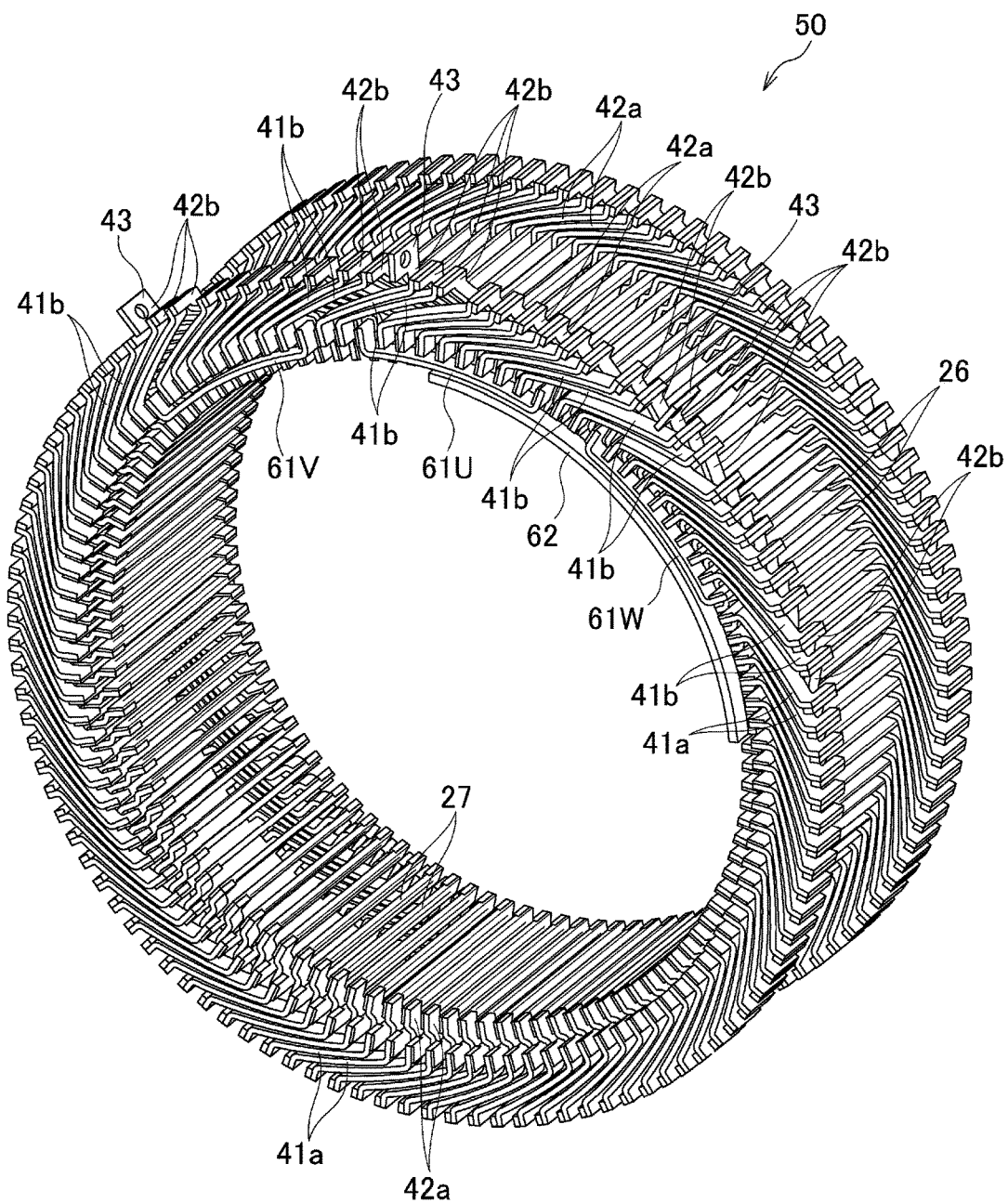
FIG. 8 is a perspective view of coil phases.
Figure 9:
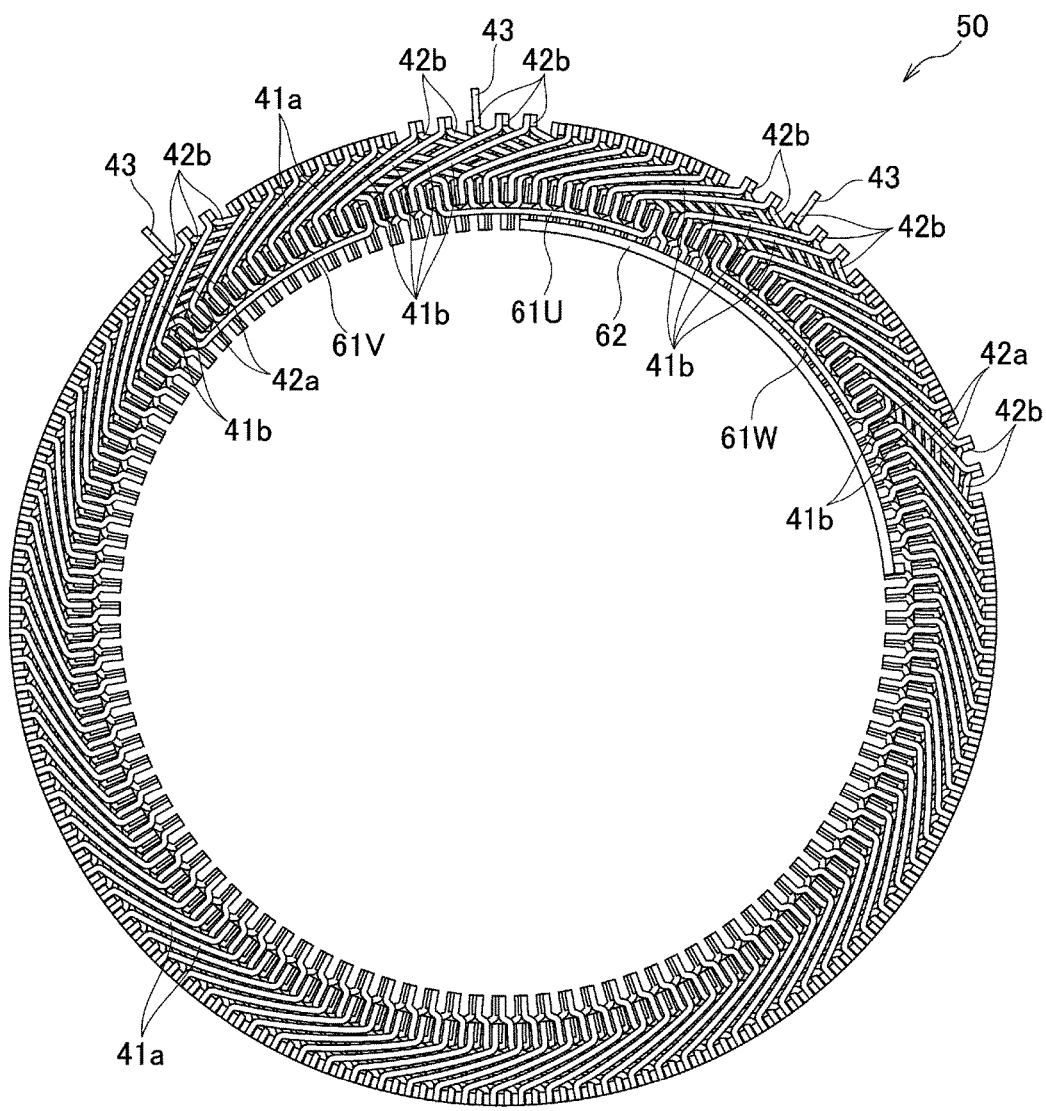
FIG. 9 is a front view of the coil phases in FIG. 8.
Figure 11:
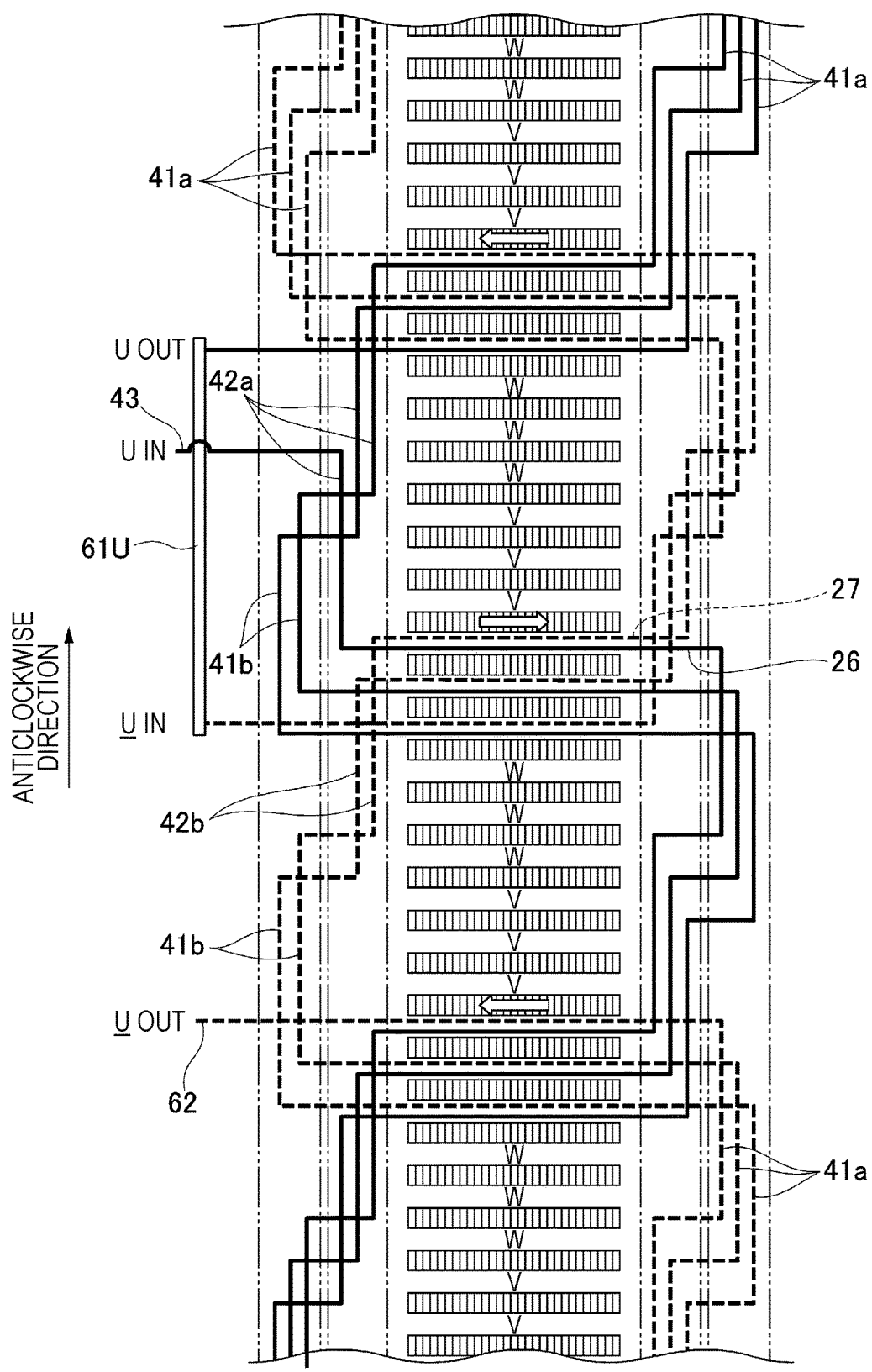
FIG. 11 is an exploded view illustrating how the U-phase coils are connected.
Figure 12:
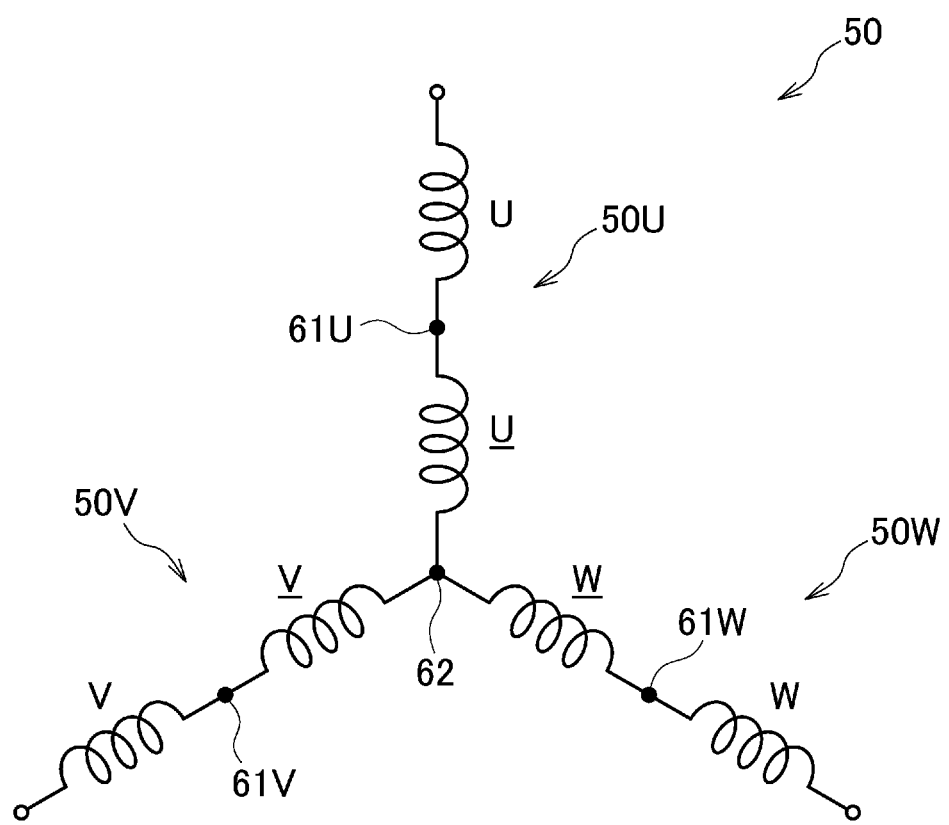
FIG. 12 is a schematic view illustrating how a U-phase coil, a V-phase coil, and a W-phase coil are connected.

As described above, the stator 10 is an assembly of the stator core assembly 20 and two baseplate assemblies 30L, 30R attached to the sides of the stator core assembly 20. The coil 50, which is segmented, provides six coil loops having the same structure for each phase (U-phase coil 50U, V-phase coil 50V, and W-phase coil 50W). Six coil loops for each phase (U-phase coil 50U, V-phase coil 50V, and W-phase coil 50W) are provided as three pairs, and three pairs of U-phase coils 50U, three pairs of V-phase coils 50V, and three pairs of W-phase coils 50W are wound in a wave winding pattern in the anticlockwise direction in this sequence (see FIG. 11). FIG. 8 is a perspective view illustrating only the segmented coils, which is included in the stator 10, of the phases (the U, V, and W phases) for ease of understanding. FIG. 9 is a front view corresponding to FIG. 8. FIG. 10 is a perspective view of one phase (U-phase, for example) of the coil. FIG. 11 is an exploded view illustrating how the coils in the U-phase are connected. FIG. 12 is a schematic view illustrating how the coils of the U-phase, the V-phase, and the W-phase are connected.

How the coils are connected in each phase will be described in more detail with reference to the U-phase coil, for example, illustrated in FIG. 11. In the six coil loops of the U-phase coil, three coil loops (U loops) are continuously wound in the wave pattern in the clockwise direction and the other three coil loops (U loops) are continuously wound in the wave pattern in the anticlockwise direction. The U loops and the U loops are connected in series by the busbar 61U. The radial outer slot coil 26 and the radial inner slot coil 27, which are disposed in the same slot 23 and covered by the insulating member 28, are a part of the coil providing the U loop and a part of the coil providing the U loop, and the flowing direction of the current therein is the same.

One of the U loops, for example, will be described in detail with reference to FIG. 11. The coil extends from the first axial end (right end in FIG. 11) of the radial outer slot coil 26, which is disposed in the slot 23 of the U-phase, to be connected to the outer connection coil 41 and the inner connection coil 42 in this sequence, and then connected to the radial inner slot coil 27 that is disposed in the slot 23 of the next U-phase. Then, the coil extends from the second axial end (left end in FIG. 11) of the radial inner slot coil 27 to be connected to the inner connection coil 42 and the outer connection coil 41 in this sequence, and then connected to the radial outer slot coil 26 that is disposed in the slot coil 23 of the next U-phase. Then, this is repeated to form the U loop.

As the above, six coil loops of the other two phases, which provide the V-phase coil (W-phase coil) include three V loops (W loops) and three V loops (W loops) wound in the wave pattern in the opposite directions that are connected in series by the busbar 61U (busbar 61W). The radial outer slot coil 26 and the radial inner slot coil 27 in the same slot 23 are a part of the coil providing the V loop (W loop) and a part of the coil providing the V loop (the W loop), and the flowing direction of the current therein is the same. As illustrated in FIG. 12, the U-phase coil 50U, the V-phase coil 50V, and the W-phase coil 50W are connected by the neutral point busbar 62 in star connection.

In the stator 10, the outer connection coils 41 and the inner connection coils 42 are positioned in an area where the stator core 21 that is virtually projected in the axial direction would be positioned, and are positioned at different axial positions. Outer surfaces of the outer connection coils 41a, 41b, which are positioned on the axial outer side of the stator 10, are flush with the end surfaces of the baseplates 31L, 31R.

As described above, the stator for a rotary electric machine 10 of this embodiment includes the slot coils 25 and the connection coils 40 as separate members (assembled coil). Thus, it is possible that the slit 27d is only provided in the slot coil 25 and not provided in the connection coil 40. Since the slot coil 25 has the slit 27d, which extends through the slot coil 25 and extends from the first axial end side toward the second axial end side, the coil eddy loss is unlikely to be caused by the flux leakage. Since the connection coils 40, where the coil eddy loss is unlikely to be caused by the flux leakage, do not have the slit, the cross-sectional area of the coil is not reduced and resistance is unlikely to be increased.

Since the slot coils 25 and the connection coils 40 are separate members (assembled coil), a step of forming the slit 27d is performed in the production of the slot coil 25. Thus, compared to production of the coil that includes a plurality of conductive wires, the number of steps in the production of the assembled coil is small.

In the above-described embodiment, the slit 27d is provided only in the radial inner slot coil 27 of the slot coil 25, which includes the radial outer slot coil 26 and the radial inner slot coil 27. However, the slit 27d may be provided only in the radial outer slot coil 26, or may be provided in both of the radial outer slot coil 26 and the radial inner slot coil 27. The slit 27d is preferably provided in the radial inner slot coil 27 of the slot coil 25, which is positioned closer to the rotor and has the relatively large rotor flux linkage. Since the slit is not provided in the radial outer slot coil 26, which is positioned on the side opposite to the rotor and has the relatively small rotor flux linkage, the cross-sectional area of the coil is unlikely to be reduced and resistance is unlikely to be increased while the coil eddy loss is effectively reduced. The slit 27d may include one slit or two slits or more and may have any size suitable for the target.

As illustrated in an enlarged view of FIG. 15A, a part of the slit 27d of the radial inner slot coil 27 is positioned in the stepped portions 27a such that the slit 27d extends beyond the end surfaces 21a, 21b of the stator core 21. This configuration reduces the coil eddy loss over the entire area of the slot 23 which has the rotor flux linkage, and thus effectively reduces the coil eddy loss. The slit 27d may have an axial length equal to or smaller than the axial width of the stator core 21 to reduce the coil eddy loss. As in a first modification illustrated in FIG. 15B, the slit 27d may be formed in almost all part of the stepped portion 27a except for a connection portion 27f. As illustrated in FIG. 15A and FIG. 15B, the slit 27d is formed in the stepped portion 27a, which provides the contact surface P3, except for at least a part thereof. Since the stepped portion 27a, which provides the contact surface P3, includes a part without the slit 27d, the slot coil 25 is readily held or positioned for the connection between the slot coil 25 and the connection coil 40, compared to the case where the slot coil 25 is separated by the slit 27d. Thus, the production efficiency is unlikely to be lowered.

Figure 16A:
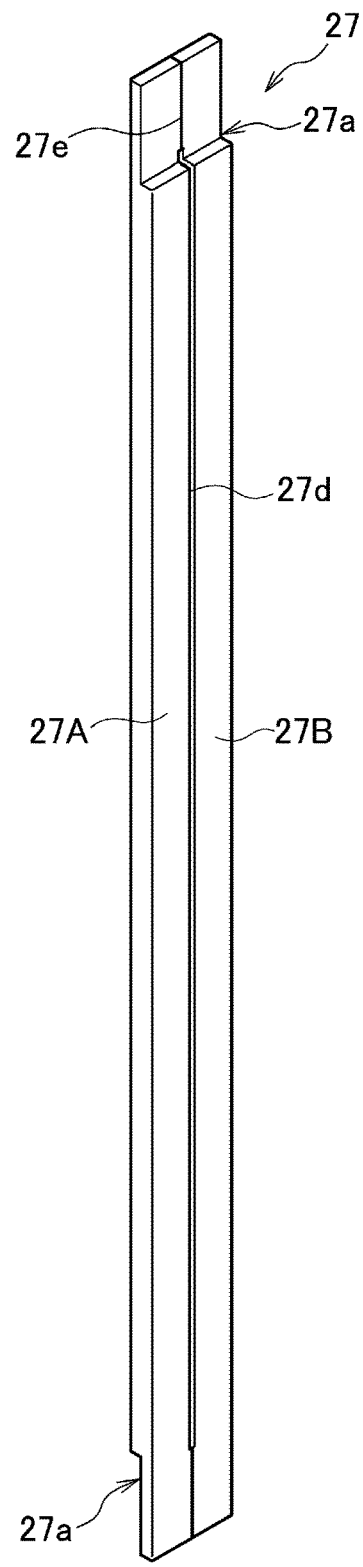
FIG. 16A is a perspective view of a radial inner slot coil according to a second modification.

In the above embodiment, the slit 27d is provided in the radial inner slot coil 27, which is a flat conductor, and the stepped portion 27a of the radial inner slot coil 27, which is connected to the radial inner end portion 122 of the inner connection coil 42, has the area without the slit. However, as in a second modification illustrated in FIG. 16A, the radial inner slot coil 27 may include two flat conductors, i.e., radial inner slot coil pieces 27A, 27B. The slit 27d may extend axially in a predetermined length along a mating surface 27e between the radial inner slot coil pieces 27A, 27B. The slit 27d may extend axially in the length equal to or smaller or larger than the axial width of the stator core 21.

Figure 16B:
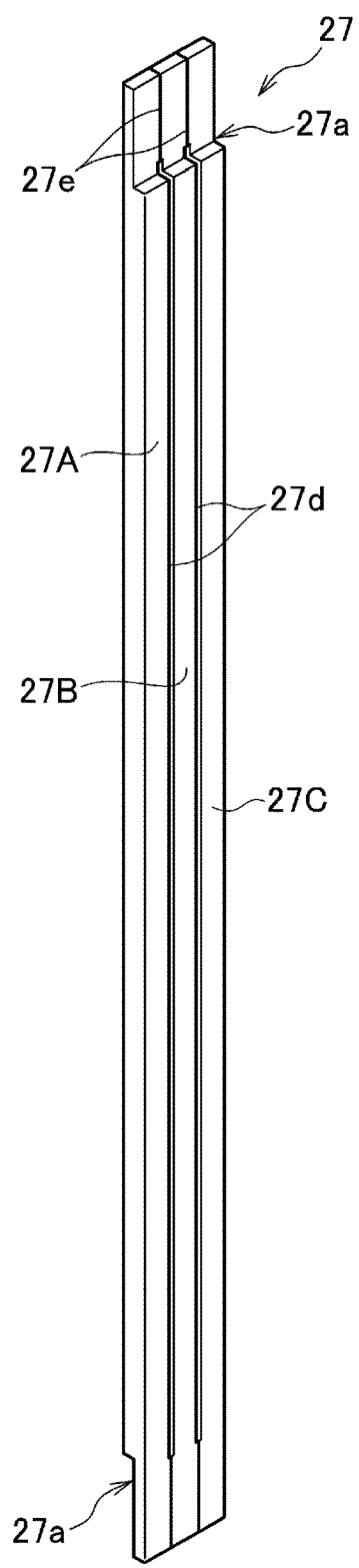
FIG. 16B is a perspective view of a radial inner slot coil according to a third modification.

FIG. 16B illustrates a third modification. The radial inner slot coil 27 includes three flat conductors, i.e., radial inner slot coil pieces 27A, 27B, 27C. The slits 27d axially extend in a predetermined length along mating surfaces 27e between the radial inner slot coil pieces 27A and 27B and between the radial inner slot coil pieces 27B and 27C.

The width of the slit in the form of the through hole, which is formed in the slot coil 25, is limited by the thickness of the slot coil 25, and it was difficult to form the through hole with a small thickness. However, as in the configuration illustrated in FIGS. 16A and 16B, the slit 27d is formed by the radial inner slot coil pieces 27A, 27B, (27C) facing each other, because a stepped recess, for example, is formed in advance in at least one of the radial inner slot coil pieces 27A, 27B, (27C). A small width slit is readily provided by this configuration. In addition, the cross-sectional area of the coil is unlikely to be reduced due to the formation of the slit 27d by setting the width of the slit 27d at a small value.

The slot coil 25 including the slot coil pieces as in the second modification (FIG. 16A) or the third modification (FIG. 16B) may not have the slit 27d in the form of the through hole. When the slot coil pieces are isolated or have high resistance due to the insulating material such as an insulation film positioned between the slot coil pieces, the coil eddy loss due to the flux leakage is unlikely to occur.

Figure 17A:
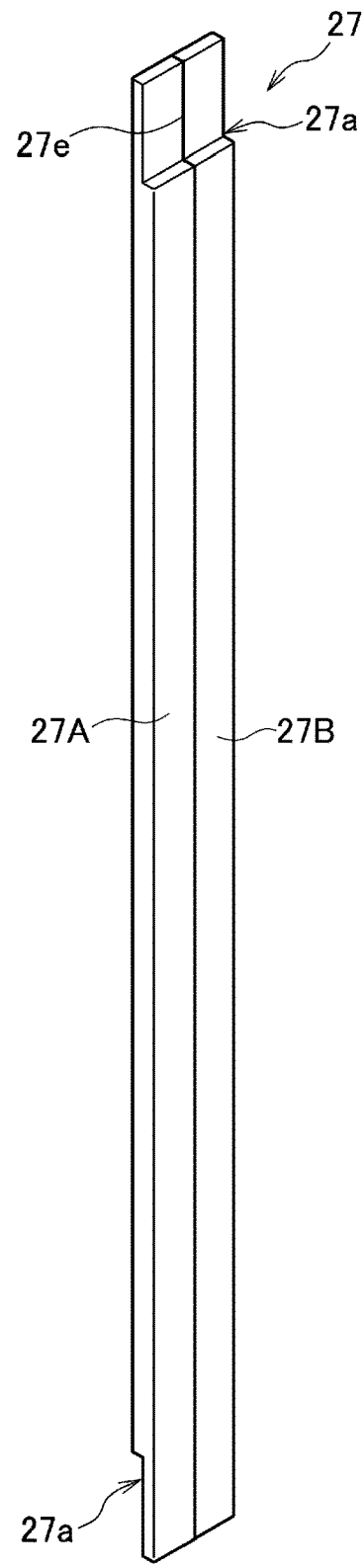
FIG. 17A is a perspective view of a radial inner slot coil according to a fourth modification.
Figure 17B:
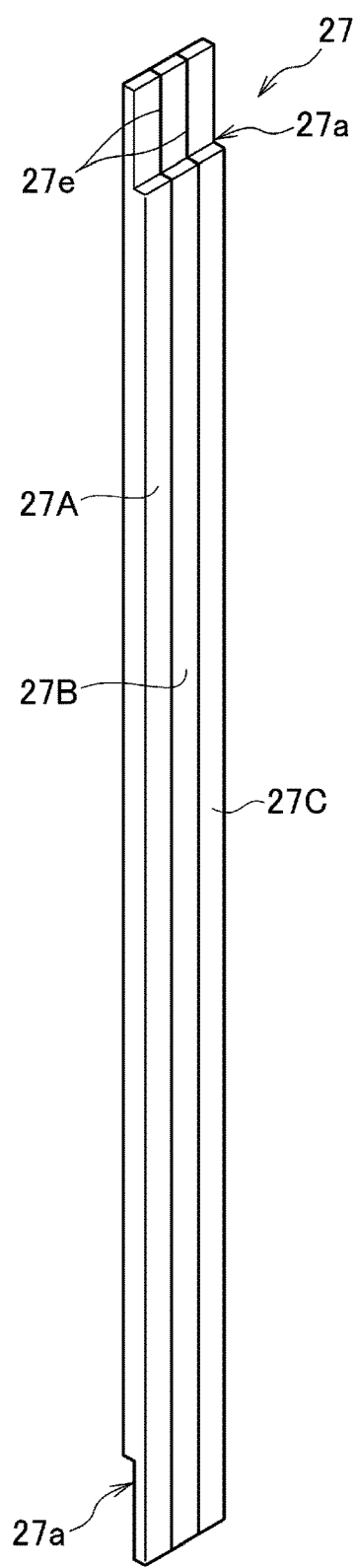
FIG. 17B is a perspective view of a radial inner slot coil according to a fifth modification.

FIG. 17A illustrates a fourth modification. The radial inner slot coil 27 includes two flat conductors, i.e., two radial inner slot coil pieces 27A, 27B. The mating surface 27e between the radial inner slot coil pieces 27A, 27B extends continuously through the radial inner slot coil 27 from one axial end thereof to the other axial end thereof. FIG. 17B illustrates a fifth modification. The radial inner slot coil 27 includes three flat conductors, i.e., the radial inner slot coil pieces 27A, 27B, 27C. The mating surfaces 27e of the radial inner slot coil pieces 27A, 27B, 27C extend continuously through the radial inner slot coil 27 from axial one end thereof to the other axial end thereof.

The present application is not limited to the above-described embodiment and may be changed, modified, or improved, for example. In the above-described embodiment, the stator is a triple-slot-type stator in which the coils of the same phase are disposed in every three adjacent slots in the circumferential direction. However, the stator may be a single-slot-type stator in which the coils of different phases are alternately disposed in each slot in the circumferential direction, or a double-slot-type stator in which the coils of the same phase are disposed in every two adjacent slots in the circumferential direction. The connection of coils is not limited to that in the above-described embodiment. The connection may be any suitable connection such as a series connection or a parallel connection. The slot coil 25 is not limited to the flat conductor having a rectangular cross-sectional shape. The slot coil 25 may be a cylindrical conductor having a circular cross-sectional shape or a columnar conductor having a polygonal cross-sectional shape. The slot coil 25 and the connection coil 40 may not be connected by welding and may be fastened by swaging. However, the slot coil including the flat conductor can readily have the slit at a predetermined position by press working. The baseplate assemblies 30L, 30R may be covered by an insulating cover that is disposed radial outward thereof or by resin.

According to a first aspect of this application, a stator for a rotary electric machine includes a stator core (stator core 21, for example, of an embodiment) having a plurality of slots (slots 23, for example, of the embodiment), and a coil (coil 50, for example, of the embodiment) attached to the stator core. The coil includes a plurality of slot coils (slot coils 25, for example, of the embodiment) disposed in the slots and a plurality of connection coils (connection coils 40, for example, of the embodiment) connecting the slot coils at a position axially outward from an axial end surface (end surface 21a, 21b, for example, of the embodiment) of the stator core. The plurality of slot coils and the plurality of connection coils are connected at a contact portion (contact surface P2, P3, for example, of the embodiment). At least one of the plurality of slot coils includes a slit (slit 27d, for example, of the embodiment) in a part positioned in the slot. The slit extends through the slot coil and extends from a first axial end side of the slot coil toward a second axial end side.

According to the first aspect, since the slot coil and the connection coil are separate members, the slit is readily formed in the slot coil where the coil eddy loss is very likely to be caused by the flux leakage. Thus, the possibility that the loss will be caused by the eddy current at the coil (hereinafter, referred to as coil eddy loss) is reduced. In addition, according to the first aspect, only the slot coil need to have a slit and the connection coil where the coil eddy loss is unlikely to be caused by the flux leakage does not need to have a slit. The slit is not formed in an unnecessary part. This reduces a decrease in the cross-sectional area of the coil and an increase in the resistance.

According to a second aspect of this application, the slit may extend beyond the axial end surfaces of the stator core.

According to the second aspect, the coil eddy loss is reduced over the entire area of the slot which has the rotor flux linkage, and thus the coil eddy loss is effectively reduced.

According to a third aspect of this application, the contact portion may be positioned at a predetermined axial position of the slot coil, and the slit may extend in the contact portion except for at least a part of the contact portion.

According to the third aspect, the coil eddy loss at the slot coil is reduced. In addition, since the contact portion includes the part where no slit is formed, the slot coil is readily held or positioned to be connected to the connection coil compared with the slot coil completely separated by the slit. Thus, the production efficiency is not lowered.

According to a fourth aspect of this application, the plurality of slot coils may include a slot coil including slot coil pieces (radial inner slot coil pieces 27A, 27B, 27C, for example, of an embodiment), and the slit may be positioned at a predetermined axial position of a mating surface (mating surface 27e, for example, of the embodiment) of the slot coil pieces. The mating surface extends from a first axial end side toward a second axial end side.

The slit in the form of the through hole formed in the slot coil may not have a small width, because the width of the through hole is limited by the thickness of the slot coil. However, according to the fourth aspect, at least one of the slot coil pieces may have a stepped recess, for example, at the mating surface. This configuration provides the slit when the slot coil pieces are joined. Thus, the slit having the small width is readily formed.

According to a fifth aspect of this application, at least two slot coils are positioned along a radial direction in the slot, and one of the slot coils (radial inner slot coil 27, for example, of the embodiment) that is positioned closest to a rotor may include the slit and a remaining slot coil (radial outer slot coil 26, for example, of the embodiment) may include no slit.

According to the fifth aspect, the slit is formed in the slot coil that is positioned closer to the rotor, which has a relatively large rotor flux linkage, and the slit is not formed in the slot coil that is positioned on the side opposite to the rotor, which has a relatively small rotor flux linkage. This configuration effectively reduces the coil eddy loss, and further reduces a decrease in the cross-sectional area of the coil and an increase in the resistance.

According to a sixth aspect of this application, the slot coil may include a flat conductor, and the slit may extend through the flat conductor in a thickness direction of the flat conductor.

According to the sixth aspect, the slot coil having the slit at a predetermined position is readily produced by a press working, for example.

According to a seventh aspect of this application, a stator (stator 10, for example, of the embodiment) for a rotary electric machine includes a stator core (stator core 21, for example, of the embodiment) having a plurality of slots (slots 23, for example, of the embodiment) and a coil (coil 50, for example, of the embodiment) attached to the stator core. The coil includes a plurality of slot coils (slot coils 25, for example, of the embodiment) disposed in the slots and a plurality of connection coils (connection coils 40, for example, of the embodiment) connecting the slot coils at a position axially outward of an axial end surface (end surface 21a, 21b, for example, of the embodiment) of the stator core. The slot coils and the connection coils are connected to each other at a contact portion. At least one of the slot coils includes at least two slot coil pieces (radial inner slot coil pieces 27A, 27B, 27C, for example, of the embodiment). Each of the connection coils is a single member.

According to the seventh aspect, since the slot coil and the connection coil are separate members (assembled coil), only the slot coil where the coil eddy loss is very likely to be caused by the flux leakage includes the slot coil pieces to reduce the coil eddy loss. The connection coil where the coil eddy loss is unlikely to be caused by the flux leakage is a single member. Thus, the cross-sectional area of the coil is unlikely to be reduced and the resistance is unlikely to be increased.

Obviously, numerous modifications and variations of the present invention are possible in light of the above teachings. It is therefore to be understood that within the scope of the appended claims, the invention may be practiced otherwise than as specifically described herein.

What is claimed is:

1. A stator of a rotary electric machine, comprising:
   a stator core comprising:
      slots extending in an axial direction of the stator core; and
      a first axial end surface in the axial direction; and
   a coil attached to the stator core and comprising:
      slot coils disposed in the slots, at least one of the slot coils including a slit in a part positioned in a slot among the slots, the slit extending through the at least one of the slot coils from a first axial end side of the stator core toward a second axial end side of the stator core opposite to the first axial end side in the axial direction; and
      connection coils connected to the slot coils at a contact portion at a position outward from the first axial end surface in the axial direction,
   wherein at least two slot coils of the slot coils are positioned along a radial direction of the stator core in one of the slots, and
   one of the at least two slot coils that is positioned closest to a rotor in the radial direction includes the slit and a remaining slot coil of the at least two slot coils includes no slit.

2. The stator according to claim 1,
   wherein the one of the at least two slot coils is shorter than the remaining slot coil of the at least two slot coils in the axial direction.

\* \* \* \* \*